United States Patent
Ha et al.

(10) Patent No.: US 12,504,576 B2
(45) Date of Patent: Dec. 23, 2025

(54) DISPLAY DEVICE INCLUDING LIGHT-ABSORBING LAYER WITH PHOSPHOR FOR LIGHT CONVERSION

(71) Applicant: LG ELECTRONICS INC., Seoul (KR)

(72) Inventors: Seungsu Ha, Seoul (KR); Geunhwan Kim, Seoul (KR); Juyoung Joung, Seoul (KR); Woongjoon Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/847,538

(22) PCT Filed: Sep. 16, 2022

(86) PCT No.: PCT/KR2022/013858
§ 371 (c)(1),
(2) Date: Sep. 16, 2024

(87) PCT Pub. No.: WO2023/182599
PCT Pub. Date: Sep. 28, 2023

(65) Prior Publication Data
US 2025/0208334 A1    Jun. 26, 2025

(30) Foreign Application Priority Data
Mar. 22, 2022   (KR) .................. 10-2022-0035458

(51) Int. Cl.
*F21V 8/00*     (2006.01)
*G02F 1/1335*   (2006.01)
*G02F 1/13357*  (2006.01)

(52) U.S. Cl.
CPC ......... *G02B 6/0055* (2013.01); *G02B 6/0068* (2013.01); *G02B 6/0073* (2013.01);
(Continued)

(58) Field of Classification Search
CPC .. G02B 6/0055; G02B 6/0068; G02B 6/0073; G02B 6/0088; G02B 6/009; G02B 6/0091; G02F 1/133603; G02F 1/133609
See application file for complete search history.

(56) References Cited

U.S. PATENT DOCUMENTS 5,886,759 A * 3/1999 Mashino ............... G02B 6/0061
                                                     362/617
6,345,899 B1* 2/2002 Ohkawa ............... G02B 6/0061
                                                     349/61
(Continued)

FOREIGN PATENT DOCUMENTS

| JP | 6603723 | 11/2019 |
|---|---|---|
| KR | 10-2017-0024755 | 3/2017 |
| KR | 10-2020-0001644 | 1/2020 |

OTHER PUBLICATIONS

PCT International Application No. PCT/KR2022/013858, International Search Report dated Jan. 10, 2023, 4 pages.

*Primary Examiner* — Keith G. Delahoussaye
(74) *Attorney, Agent, or Firm* — LEE, HONG, DEGERMAN, KANG & WAIMEY

(57) ABSTRACT

Disclosed is a display device. The display device of the present disclosure may include: a display panel; a light guide plate positioned behind the display panel; a reflective sheet positioned behind the light guide plate; a light-absorbing layer positioned between the light guide plate and the display panel and absorbing light within a certain wavelength range; an optical assembly providing light to one side of the light guide plate; and a side reflector positioned at the other side of the light guide plate, including a reflecting material, and having a specific color.

14 Claims, 41 Drawing Sheets

(52) U.S. Cl.
CPC ..... *G02B 6/0088* (2013.01); *G02F 1/133603* (2013.01); *G02F 1/133609* (2013.01); *G02F 1/133614* (2021.01)

(56) References Cited

U.S. PATENT DOCUMENTS

| | | | | |
|---|---|---|---|---|
| 10,490,711 | B2* | 11/2019 | Yamamoto | H10H 20/8515 |
| 10,497,842 | B2* | 12/2019 | Chen | H10H 20/8515 |
| 10,886,442 | B2* | 1/2021 | Ryohwa | H10H 20/8513 |
| 11,693,276 | B2* | 7/2023 | Kim | G02F 1/133512 |
| | | | | 349/56 |
| 2010/0271807 | A1* | 10/2010 | Chiu | G02F 1/133609 |
| | | | | 362/97.1 |
| 2011/0002140 | A1* | 1/2011 | Tsukahara | B32B 27/36 |
| | | | | 428/480 |
| 2011/0273864 | A1* | 11/2011 | Izawa | F21K 9/64 |
| | | | | 252/301.4 R |
| 2012/0182762 | A1* | 7/2012 | Hu | G02B 6/005 |
| | | | | 362/606 |
| 2012/0256163 | A1* | 10/2012 | Yoon | H10H 20/8513 |
| | | | | 257/13 |
| 2013/0193837 | A1* | 8/2013 | Ohno | B32B 15/00 |
| | | | | 428/690 |
| 2013/0335677 | A1* | 12/2013 | You | G02F 1/133609 |
| | | | | 349/65 |
| 2016/0062026 | A1* | 3/2016 | Huang | G02B 6/0043 |
| | | | | 362/606 |
| 2016/0293803 | A1* | 10/2016 | Kim | H10H 20/862 |
| 2016/0306096 | A1* | 10/2016 | Minami | G02B 6/0068 |
| 2016/0349431 | A1* | 12/2016 | Huang | G02B 6/0053 |
| 2017/0254943 | A1* | 9/2017 | Murphy | G02B 6/0023 |
| 2018/0045384 | A1* | 2/2018 | Uno | G02B 6/0043 |
| 2018/0252963 | A1* | 9/2018 | Kim | G02F 1/133602 |
| 2019/0056547 | A1* | 2/2019 | Hwang | G02B 6/0023 |
| 2019/0204496 | A1* | 7/2019 | Lee | G02B 6/0066 |
| 2019/0324192 | A1* | 10/2019 | Park | G02B 6/0088 |
| 2020/0064690 | A1* | 2/2020 | Xu | G02F 1/133605 |
| 2020/0124886 | A1* | 4/2020 | Song | G02B 6/0068 |
| 2022/0187525 | A1* | 6/2022 | Lim | G02B 6/0076 |
| 2023/0039599 | A1* | 2/2023 | Chiu | G02F 1/133609 |
| 2023/0205009 | A1* | 6/2023 | Lim | G02F 1/133614 |

* cited by examiner

[FIG. 1]
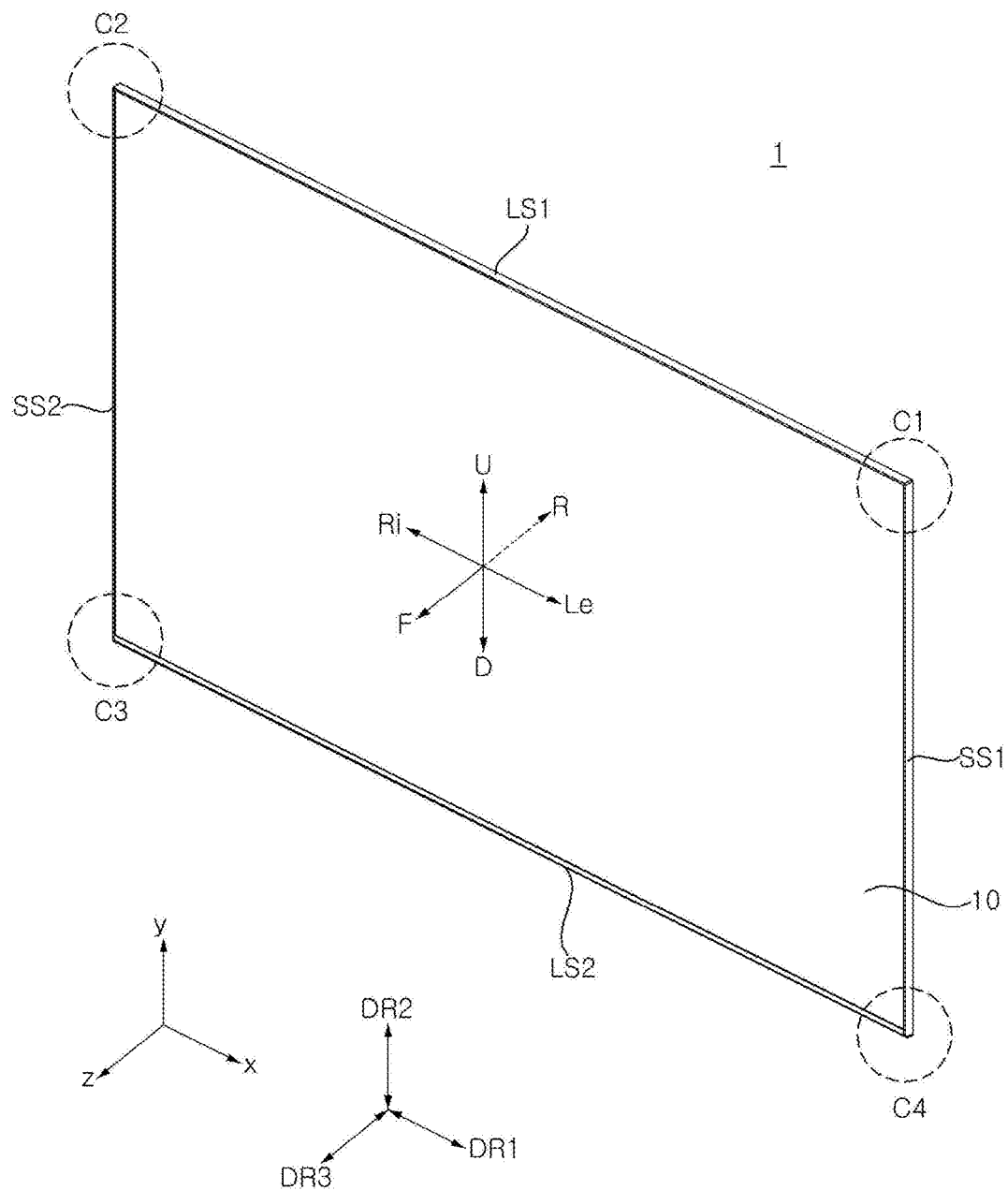

[FIG. 2]
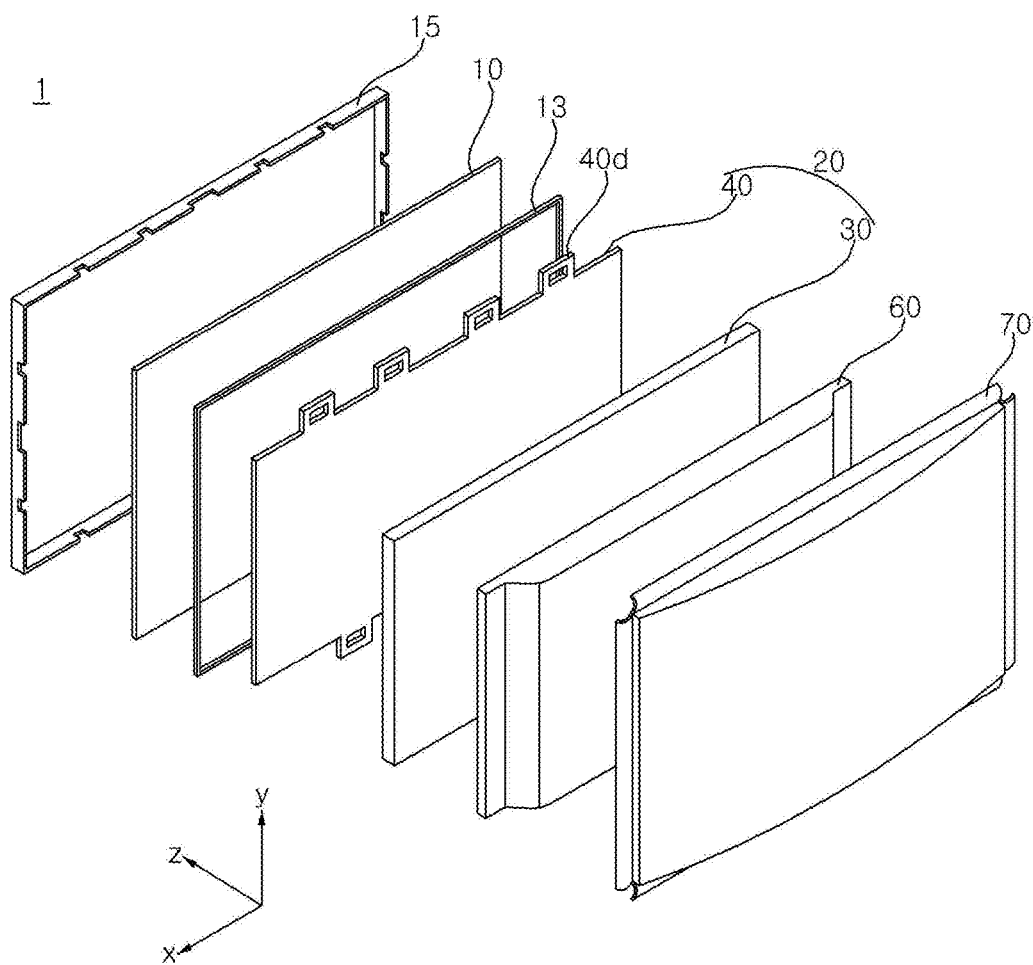

[FIG. 3]
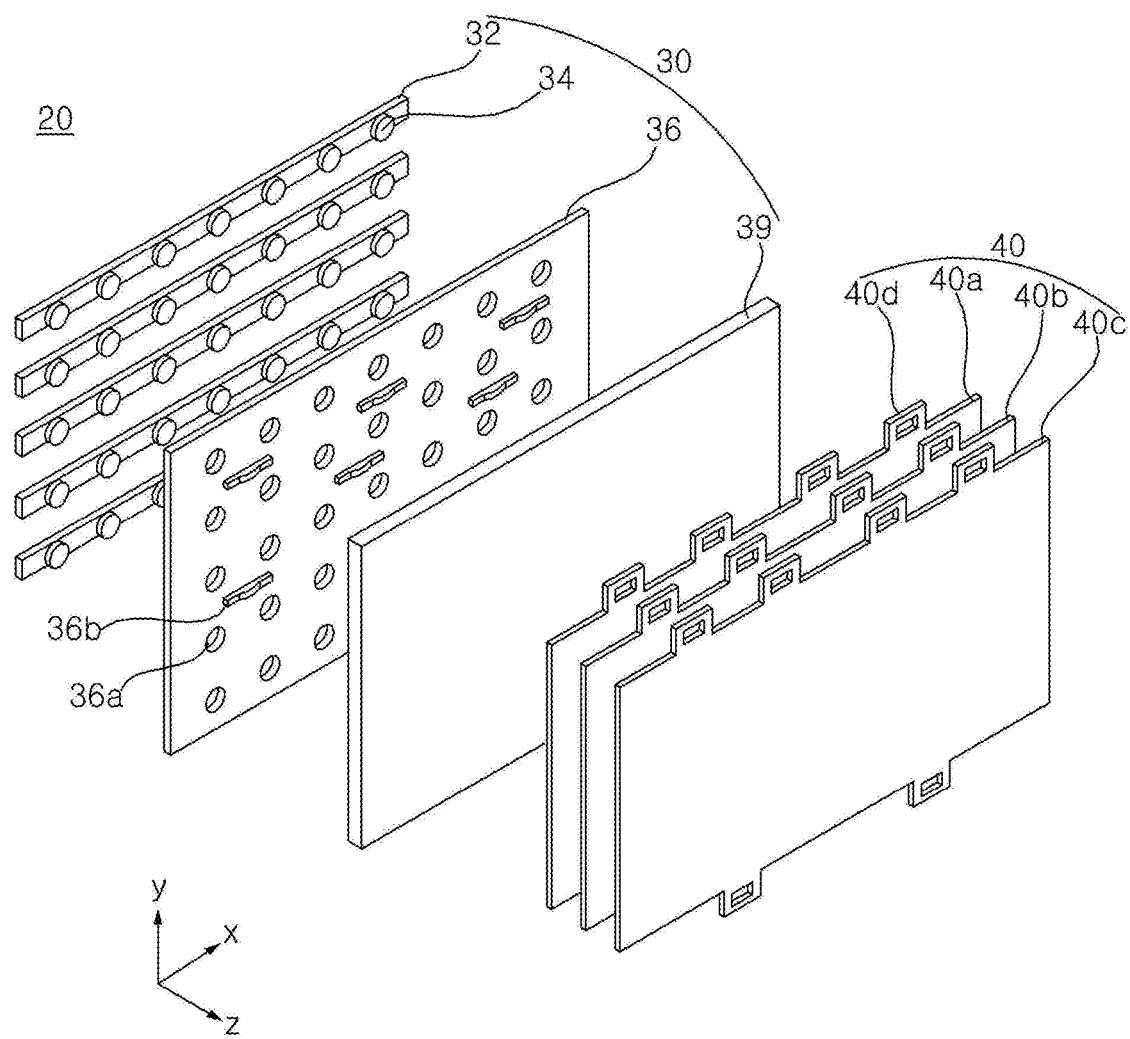

[FIG. 4]
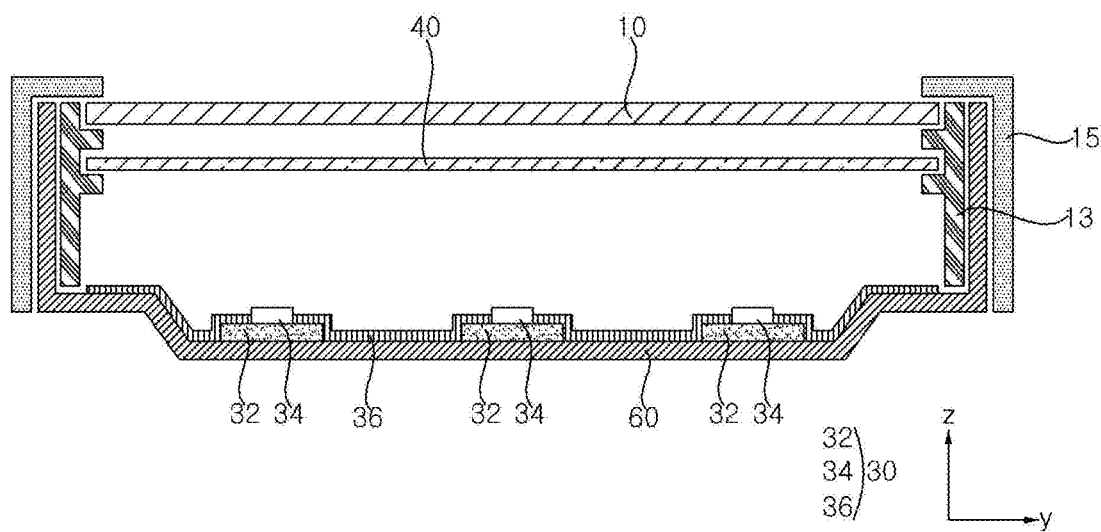

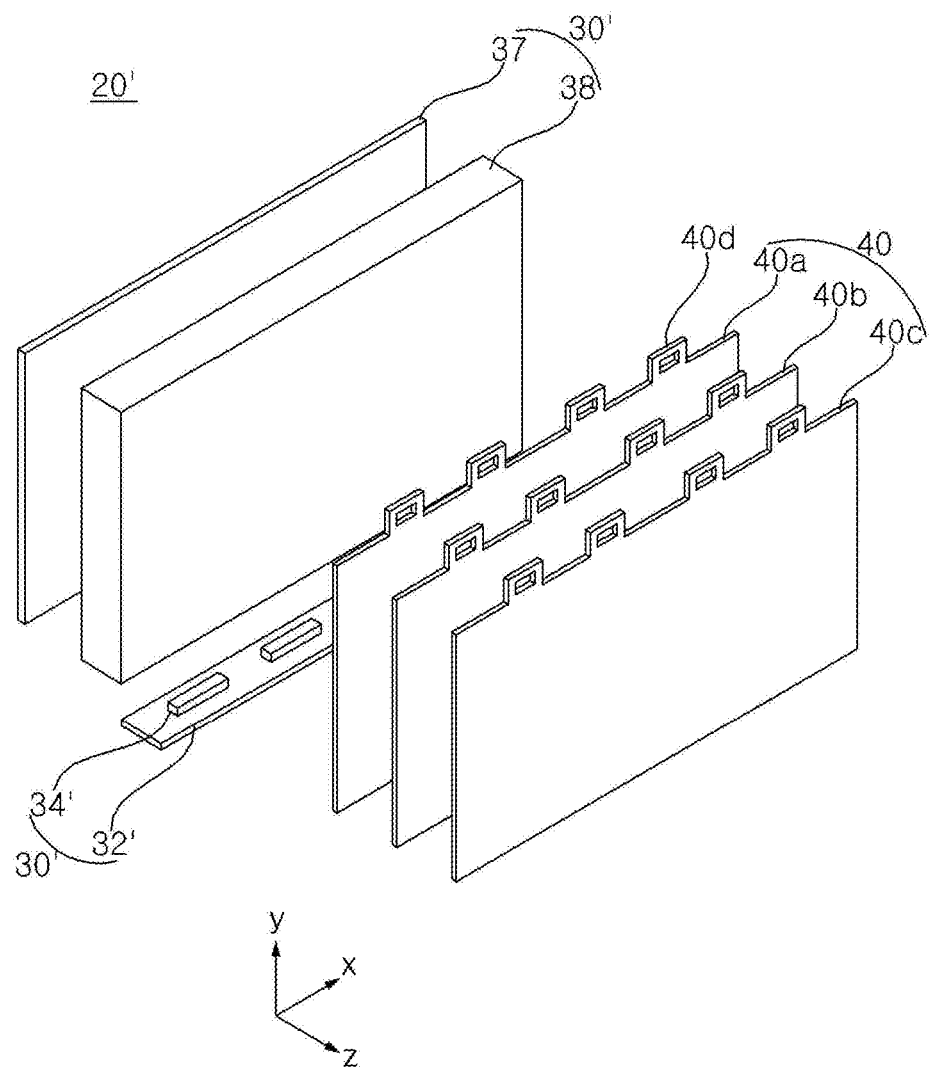
[FIG. 5]

[FIG. 6]
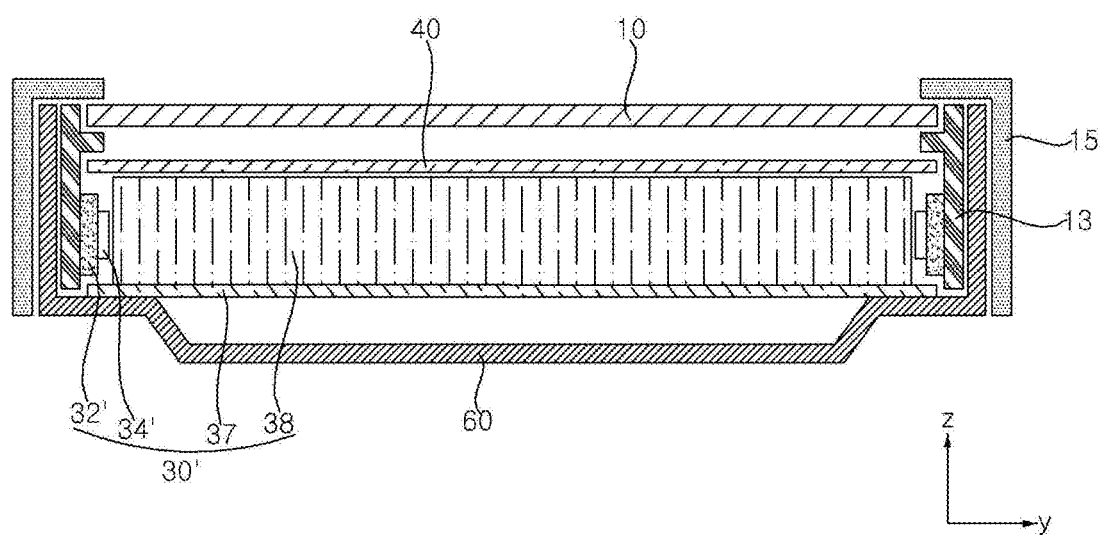

[FIG. 7]
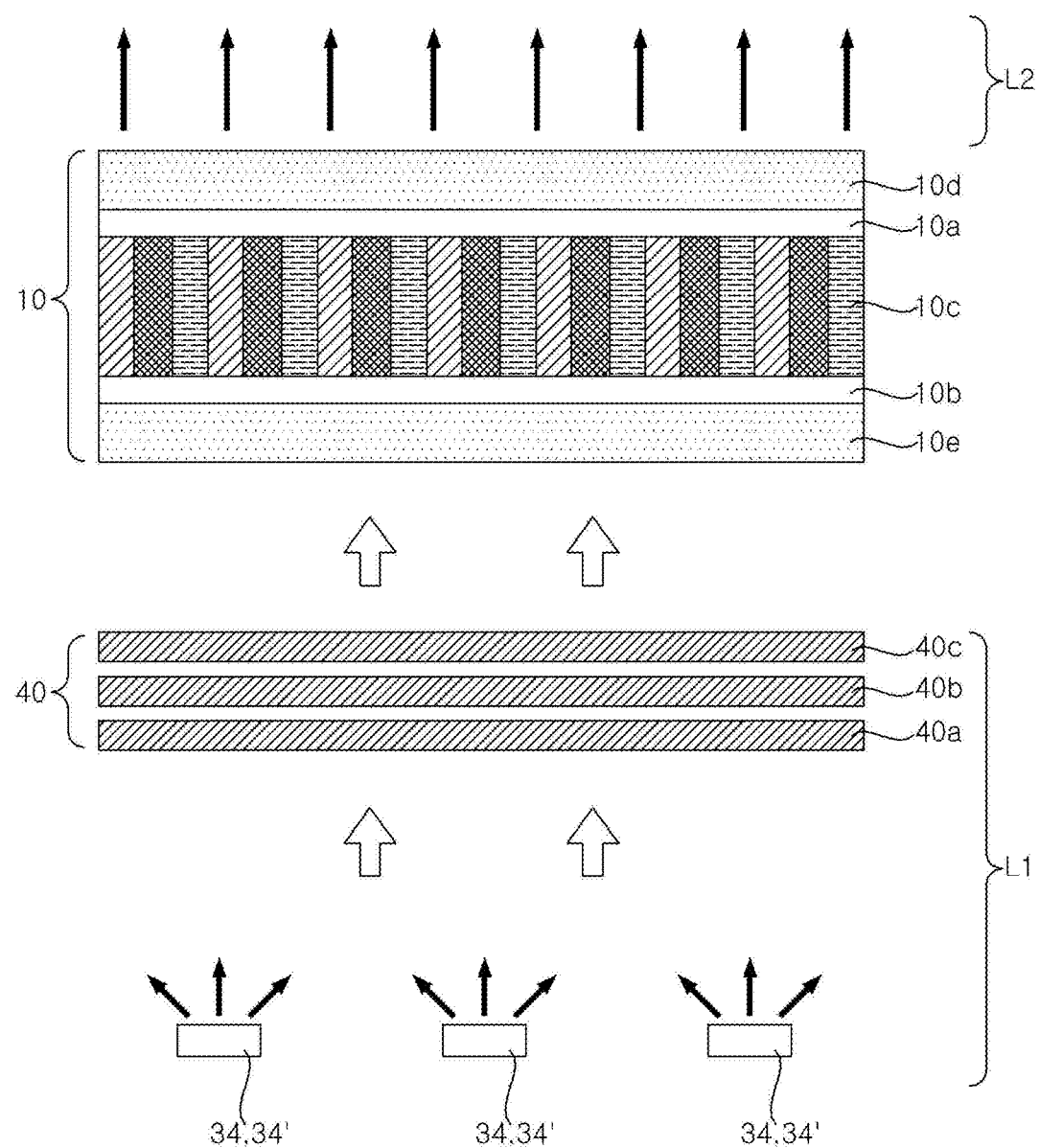

[FIG. 8]
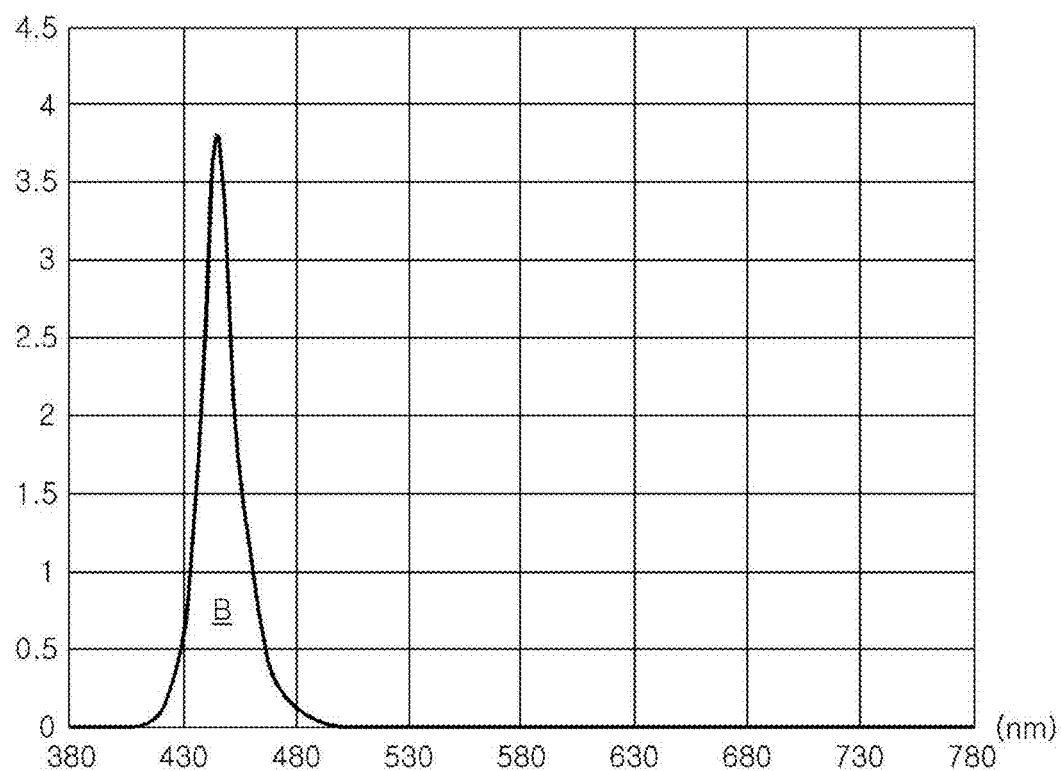

[FIG. 9]
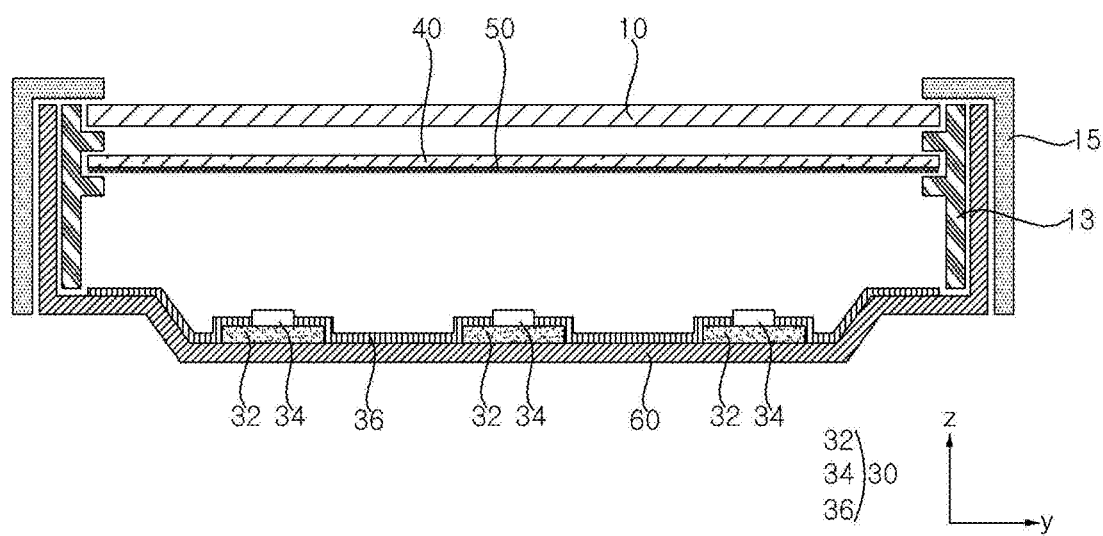

[FIG. 10]
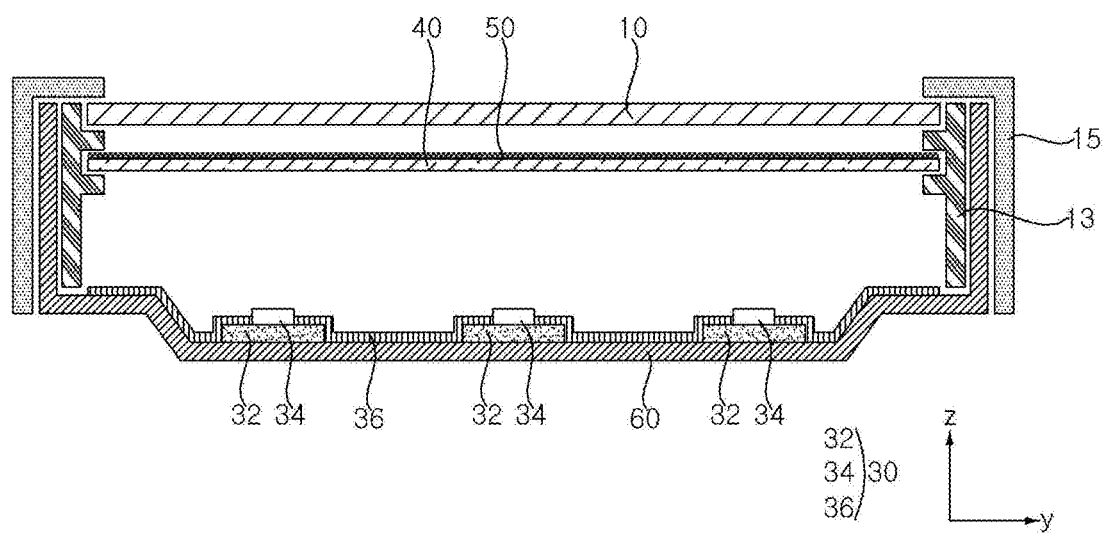

[FIG. 11]
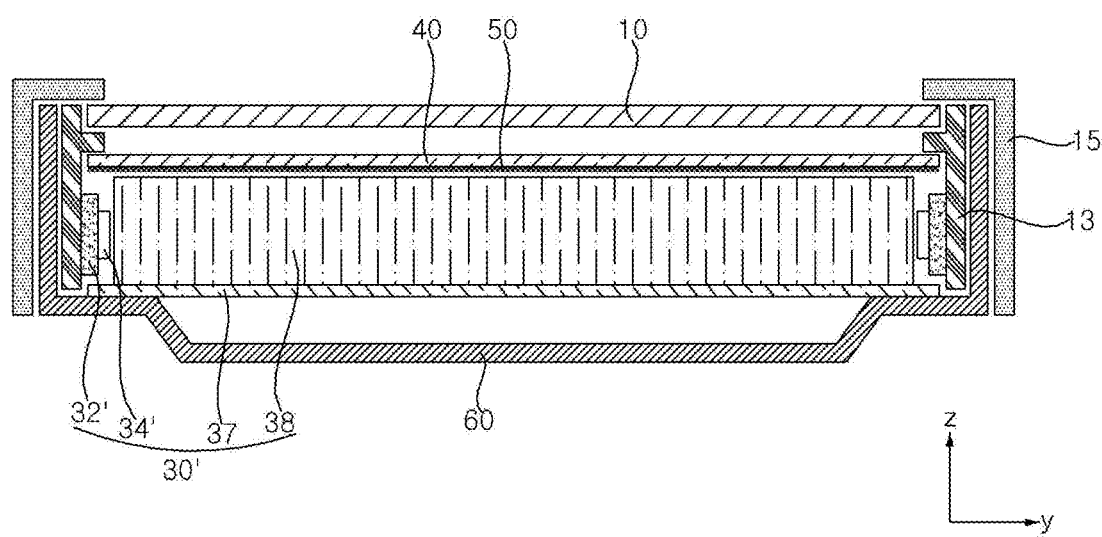

[FIG. 12]
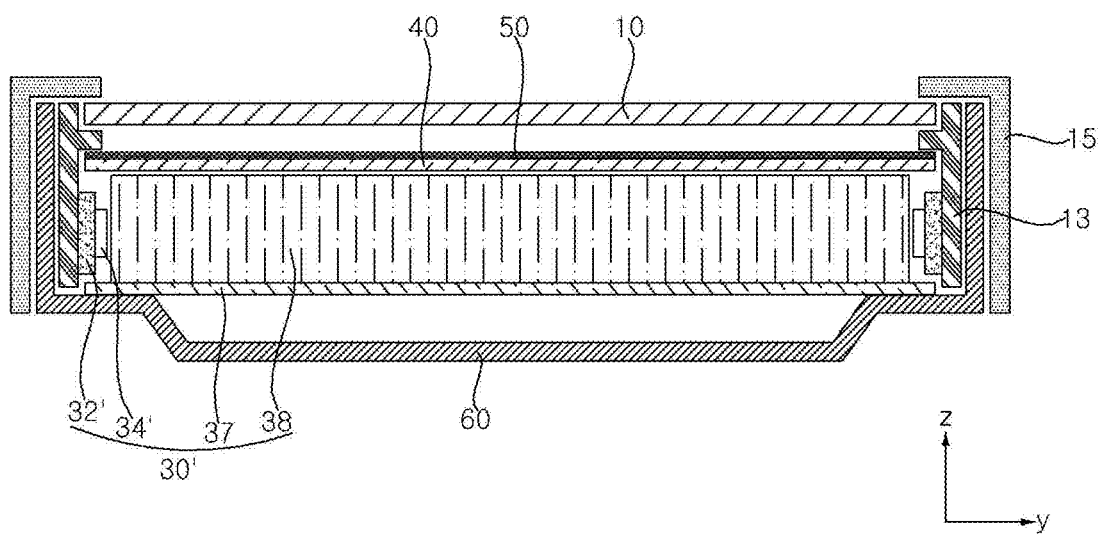

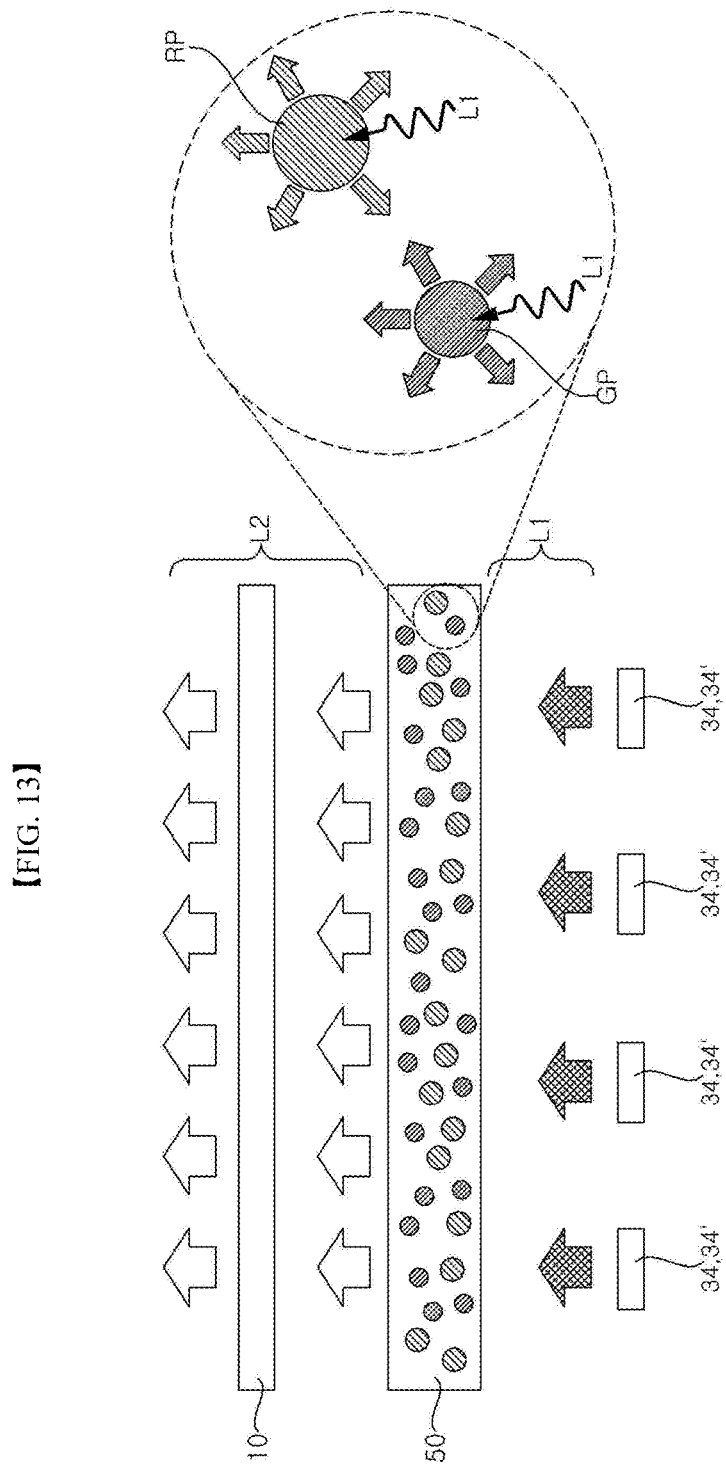

[FIG. 14]
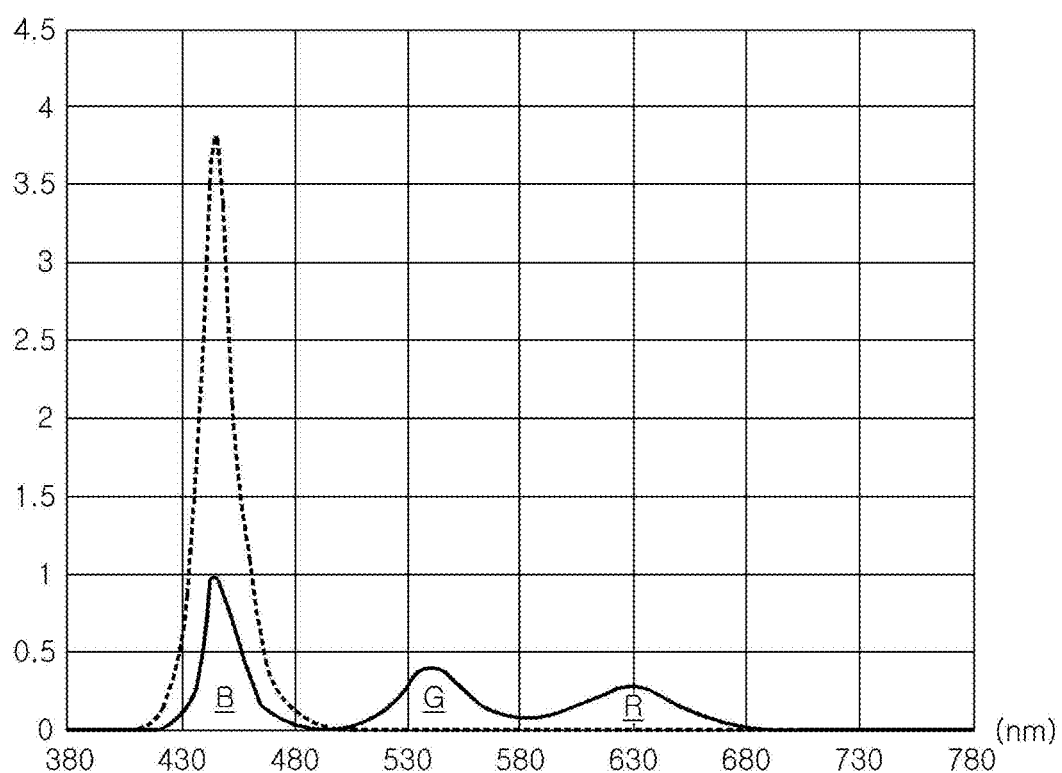

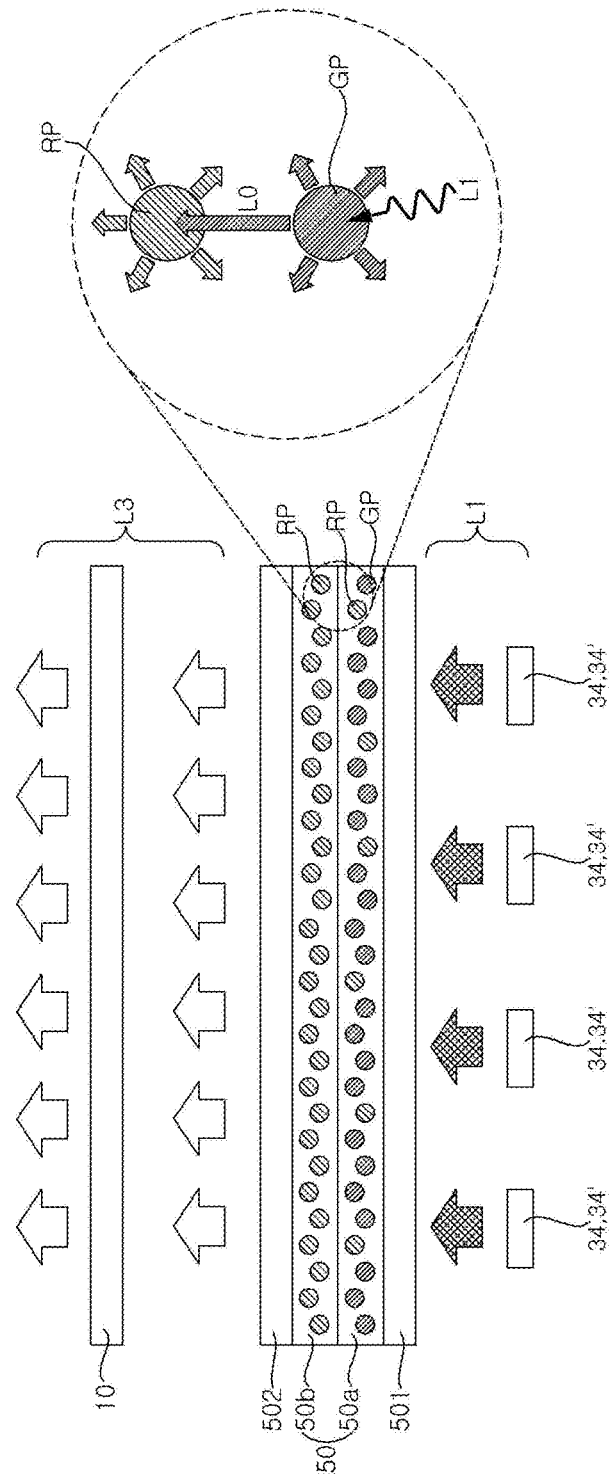
[FIG. 15]

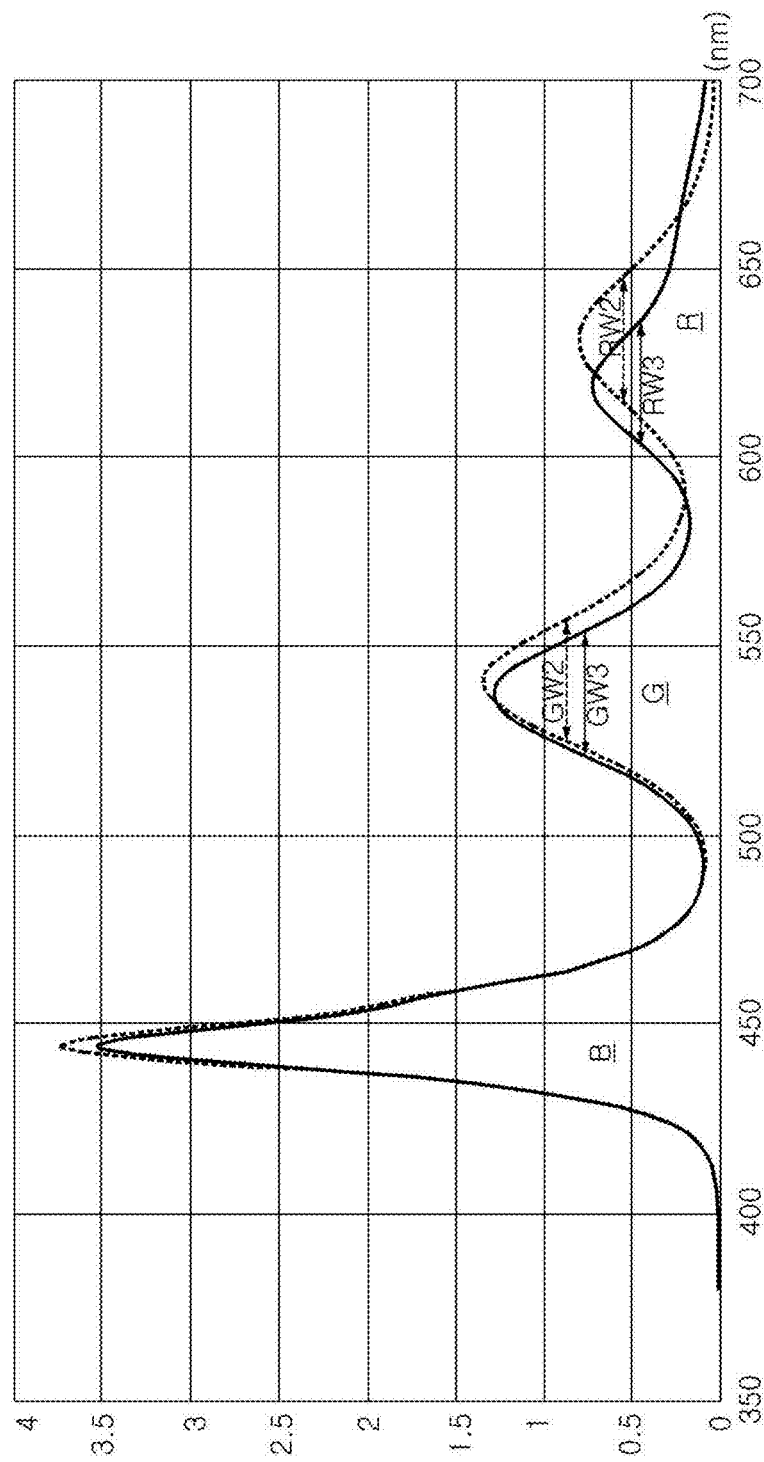
[FIG. 16]

[FIG. 17]
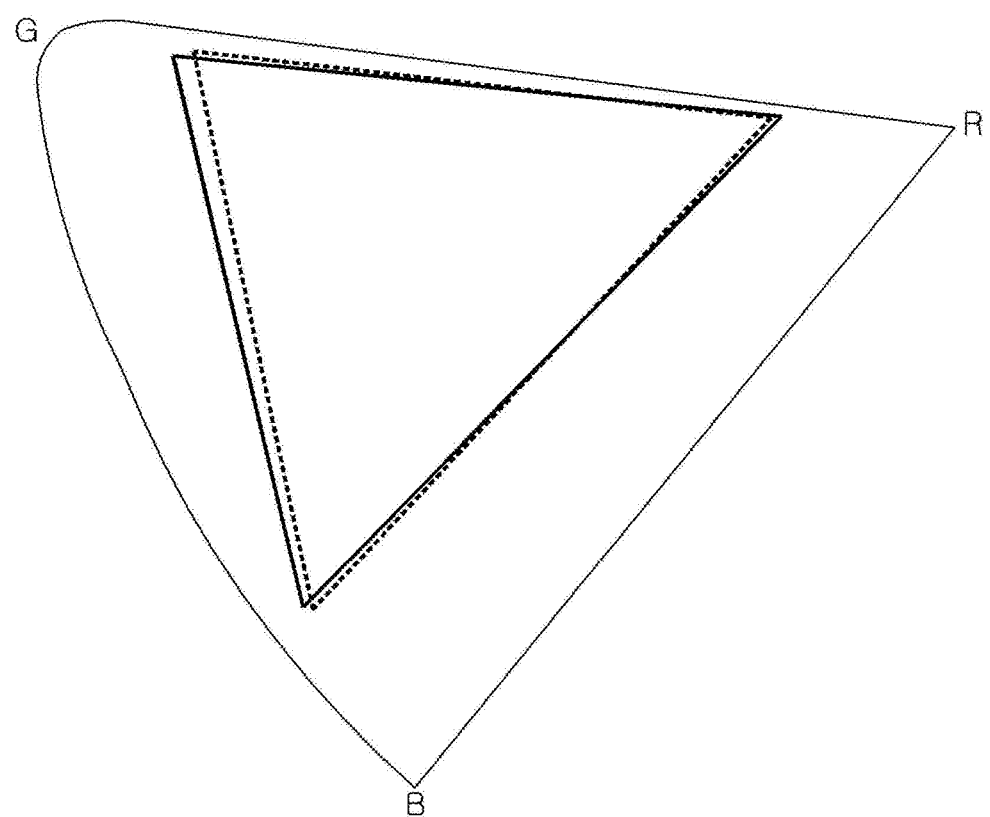

[FIG. 18]
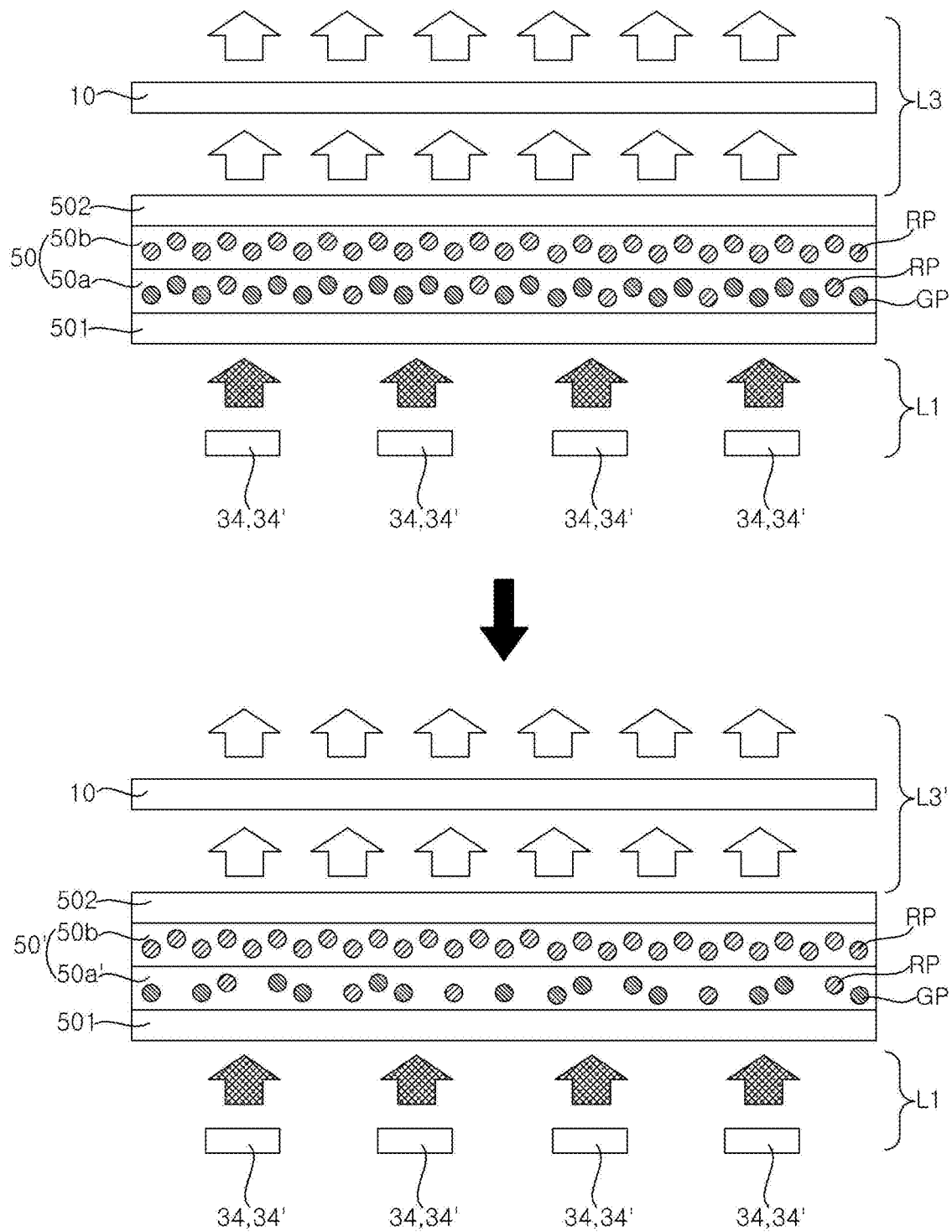

[FIG. 19]
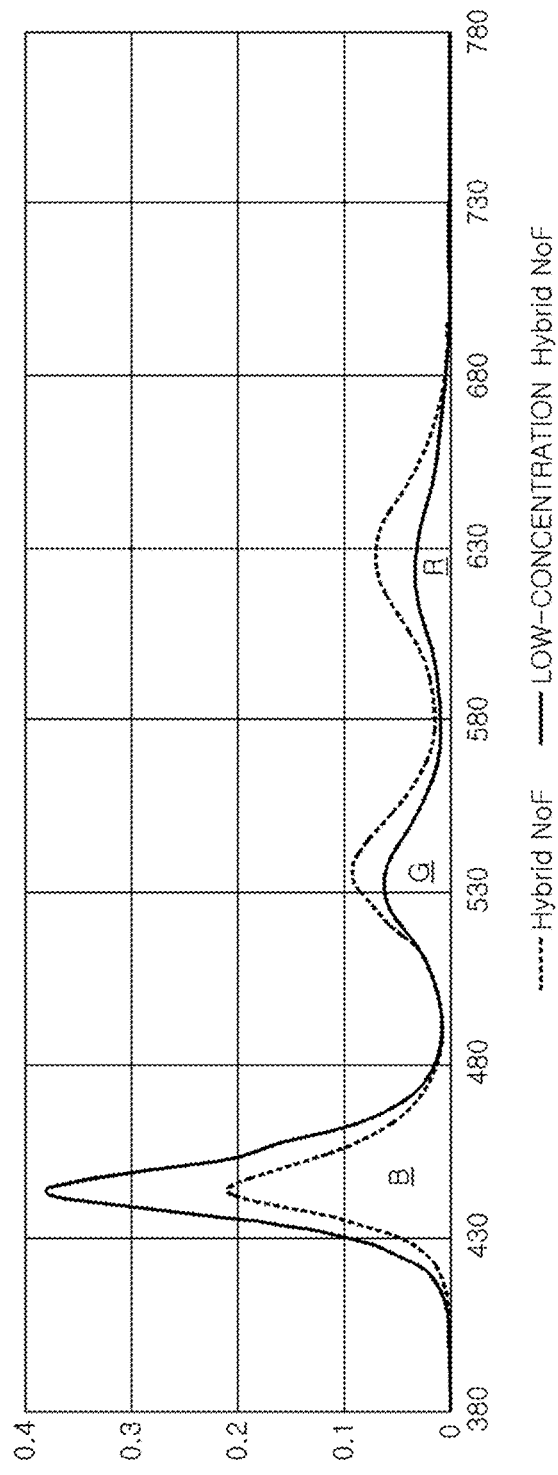

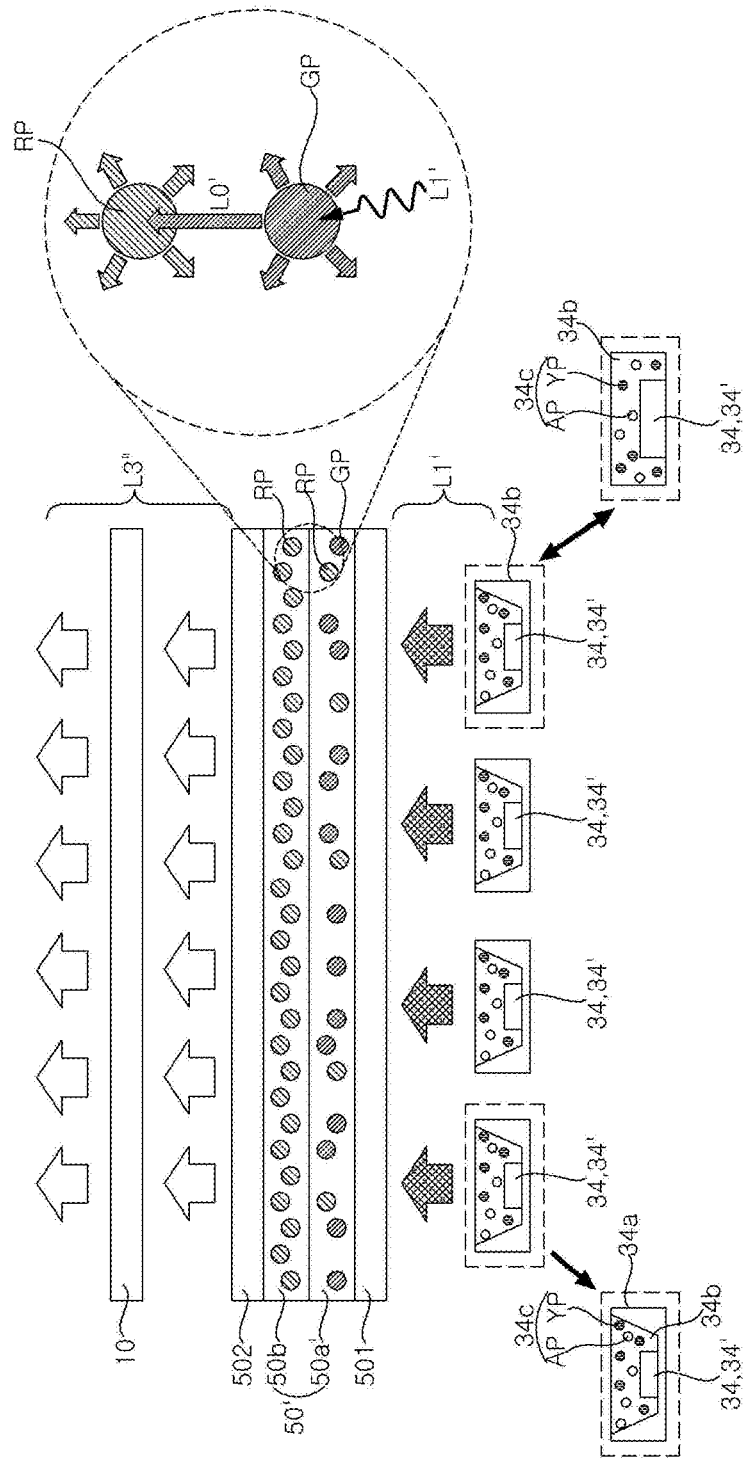
[FIG. 20]

[FIG. 21]
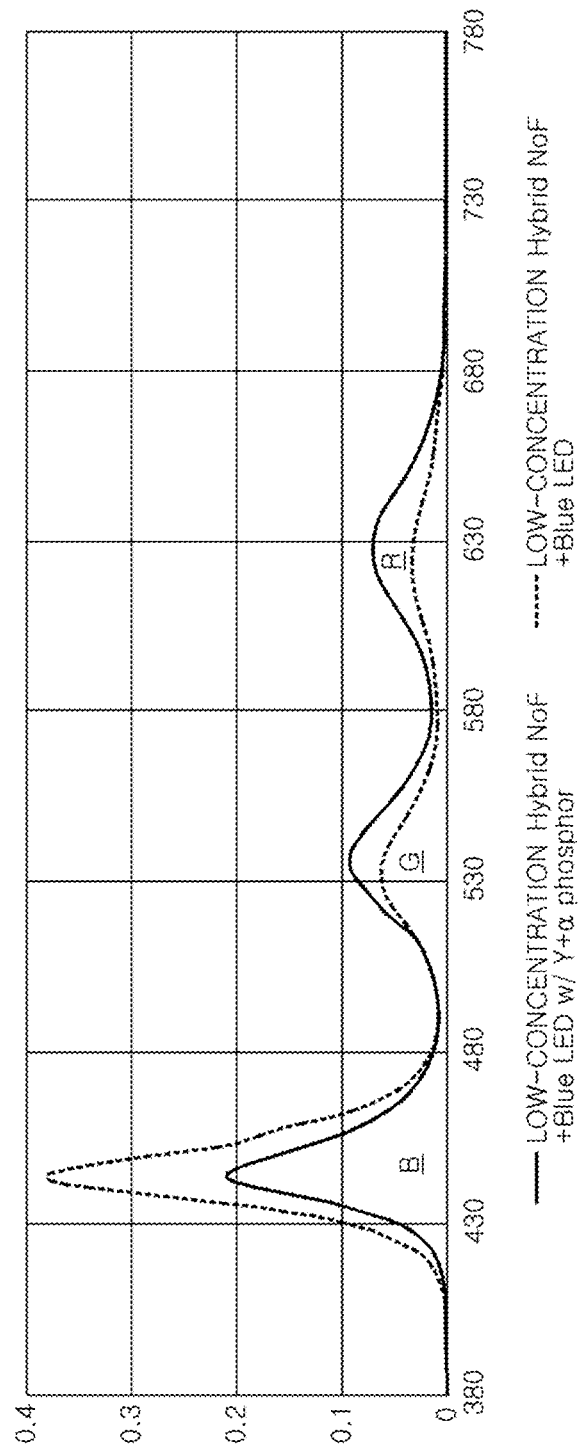

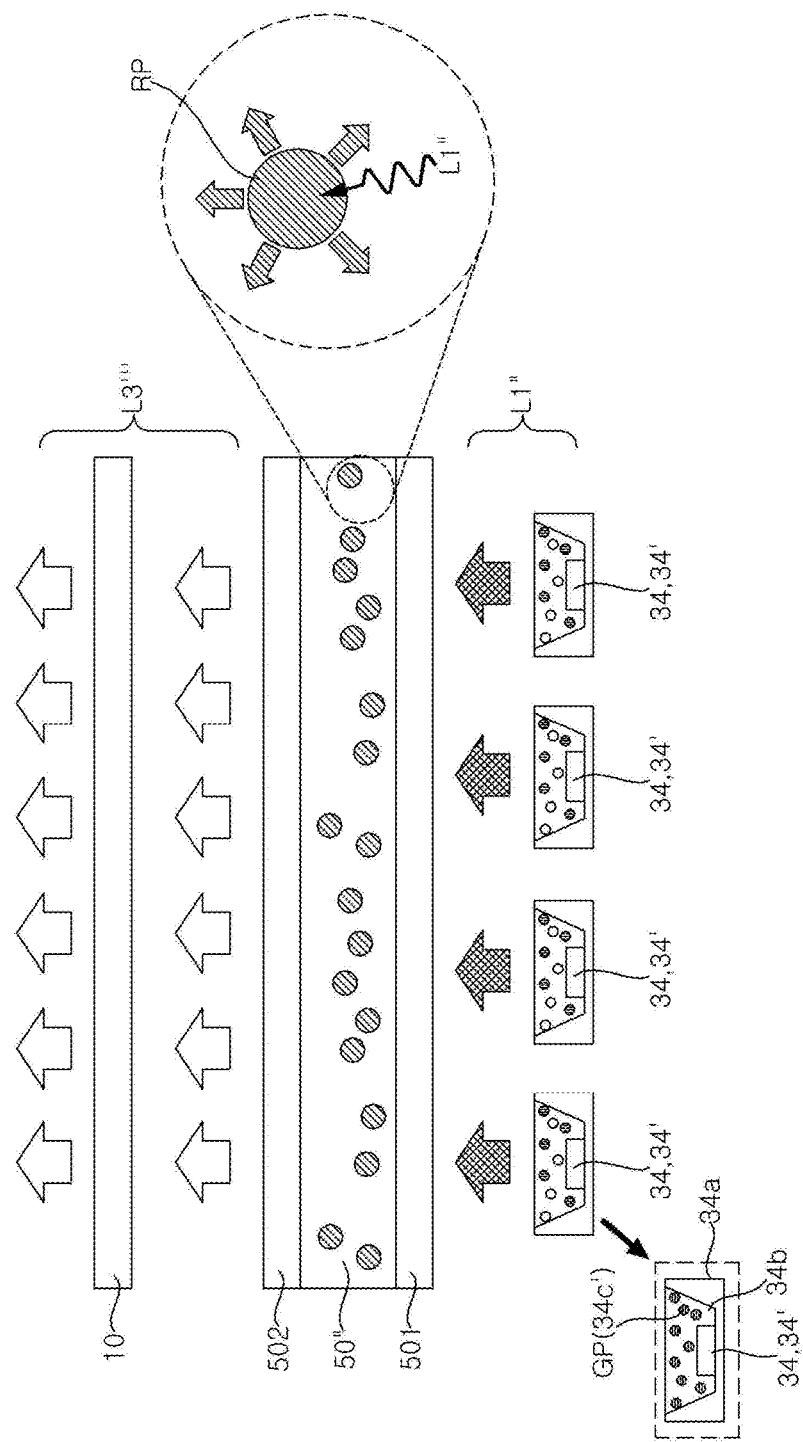

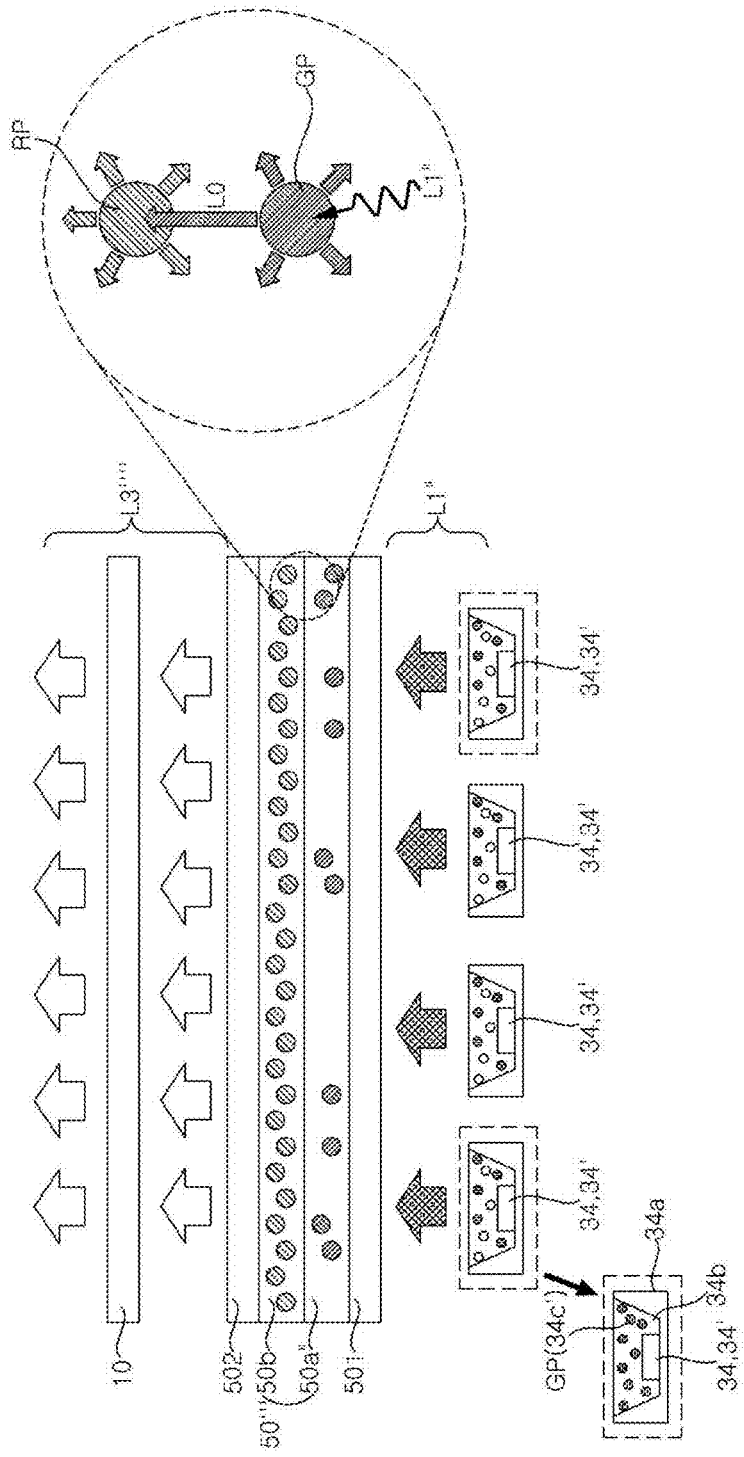
[FIG. 23]

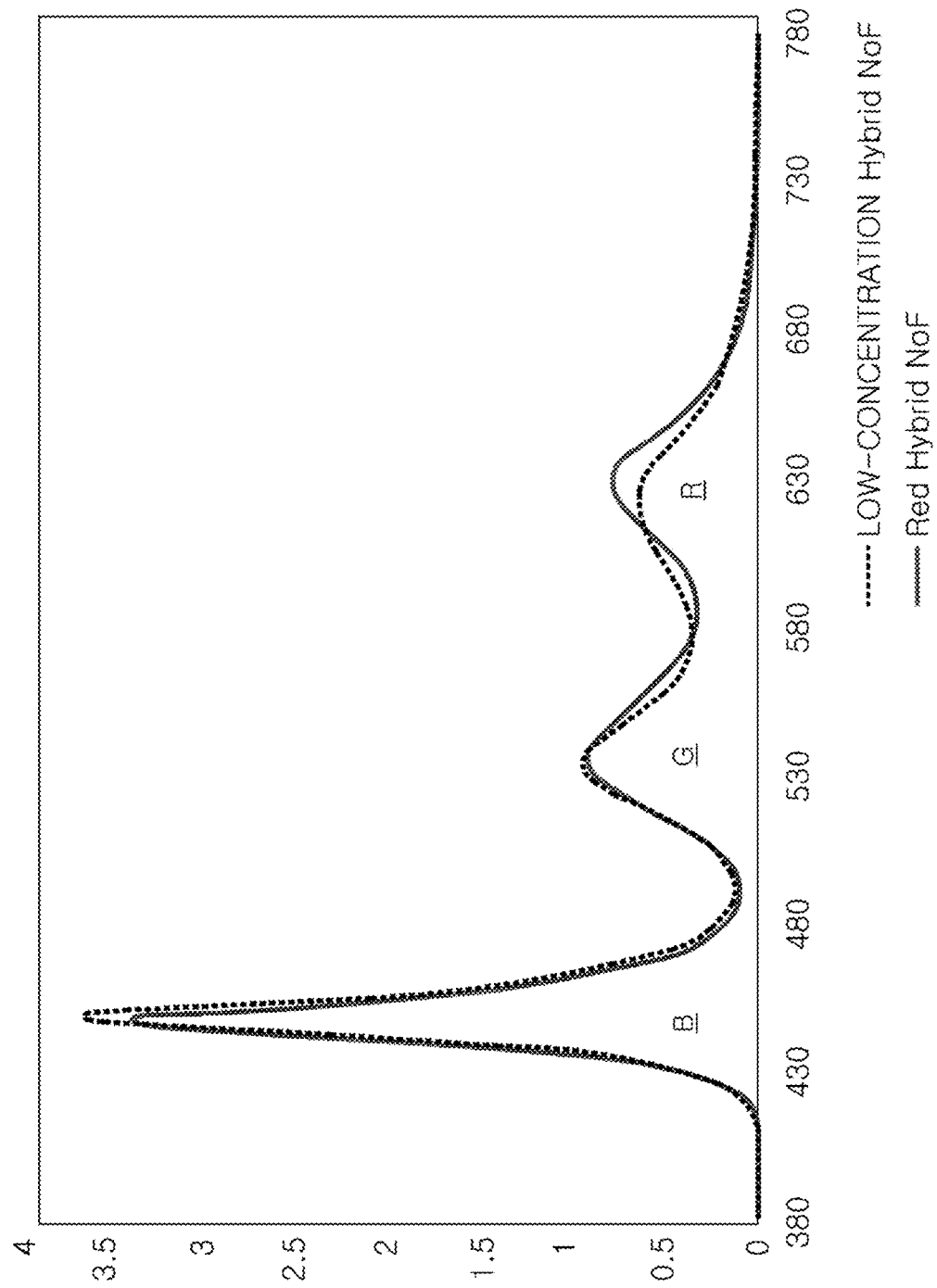
[FIG. 24]

[FIG. 25]
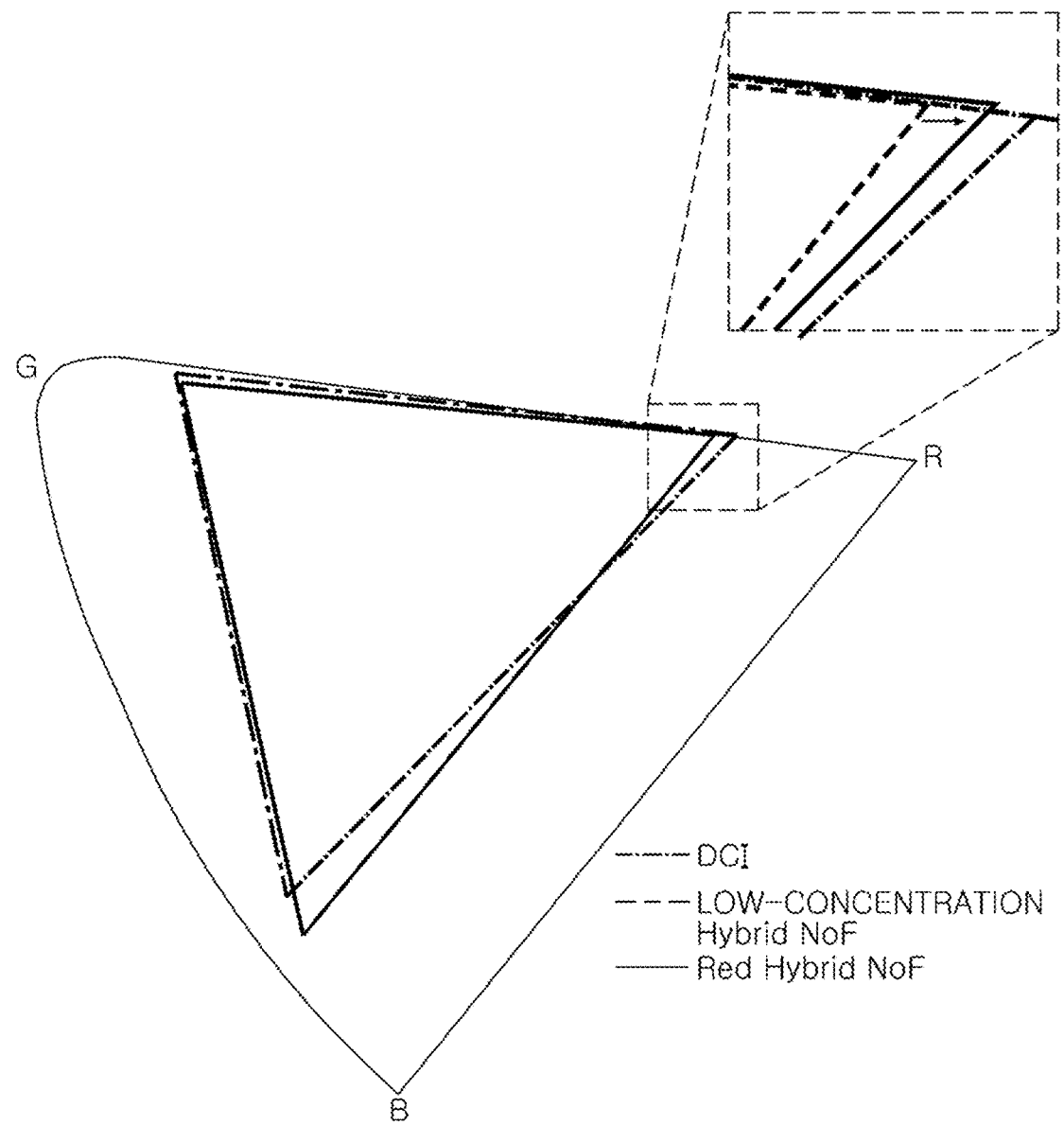

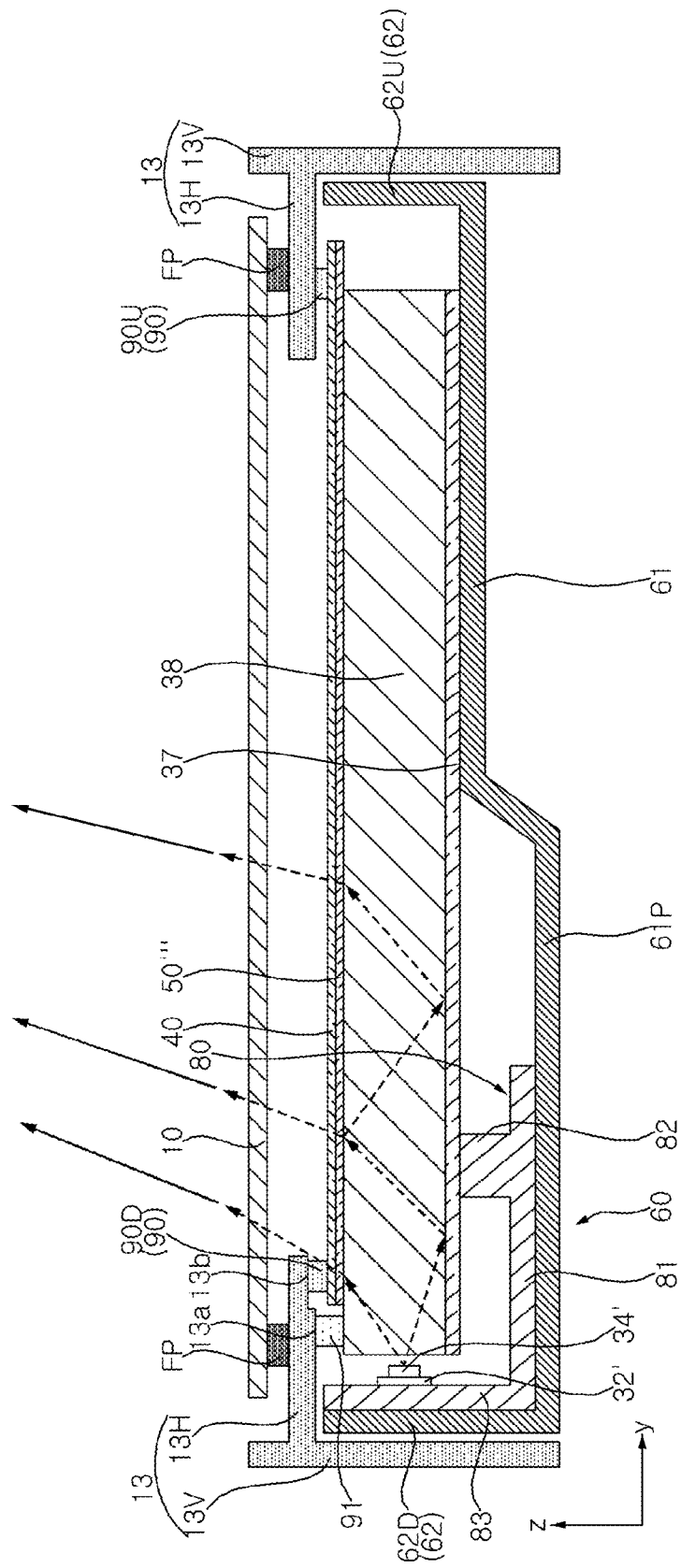
[FIG. 26]

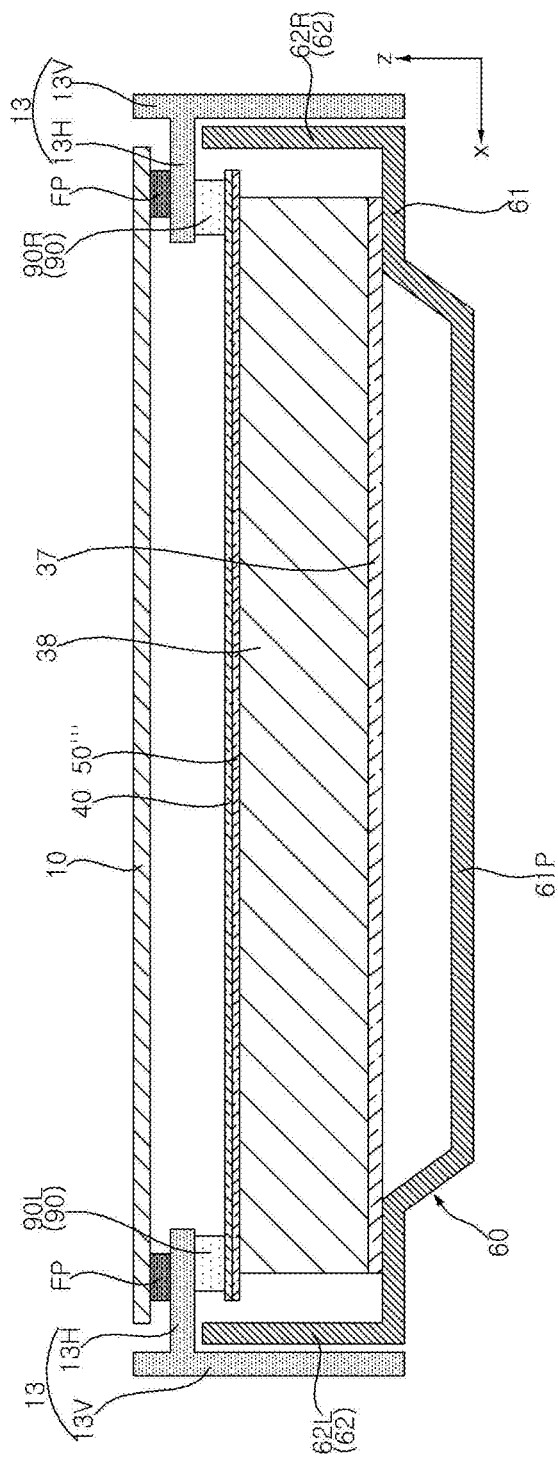
[FIG. 27]

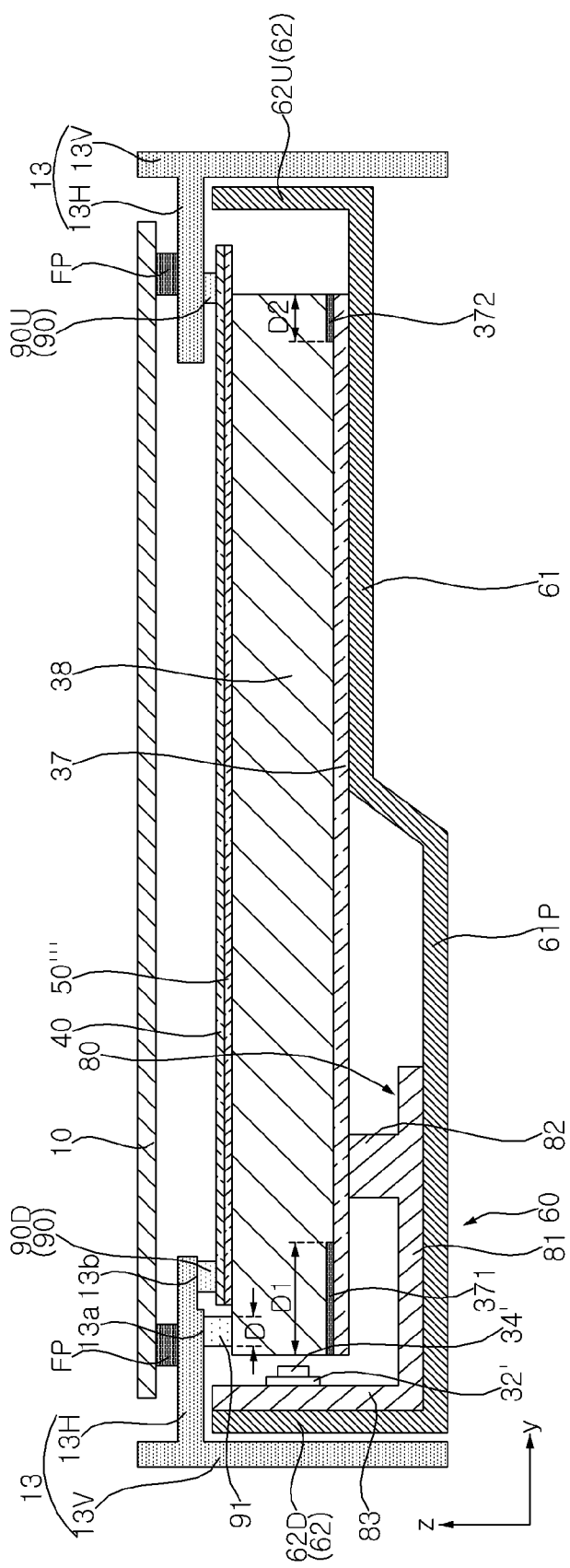
[FIG. 28]

[FIG. 29]
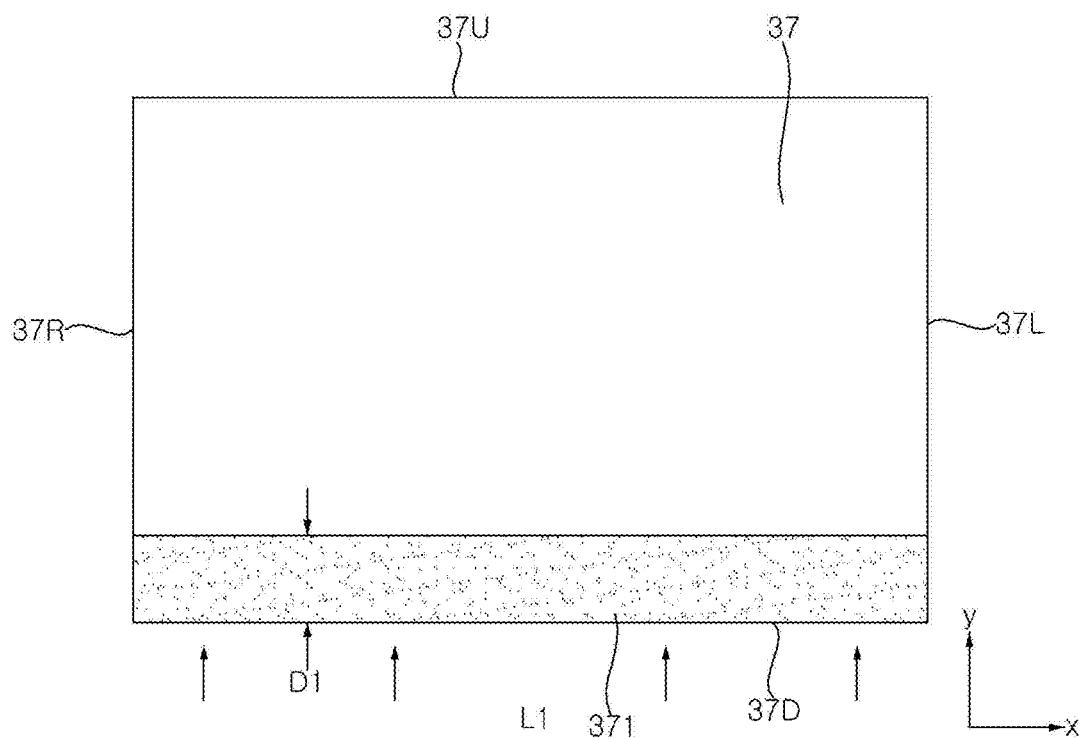

[FIG. 30]
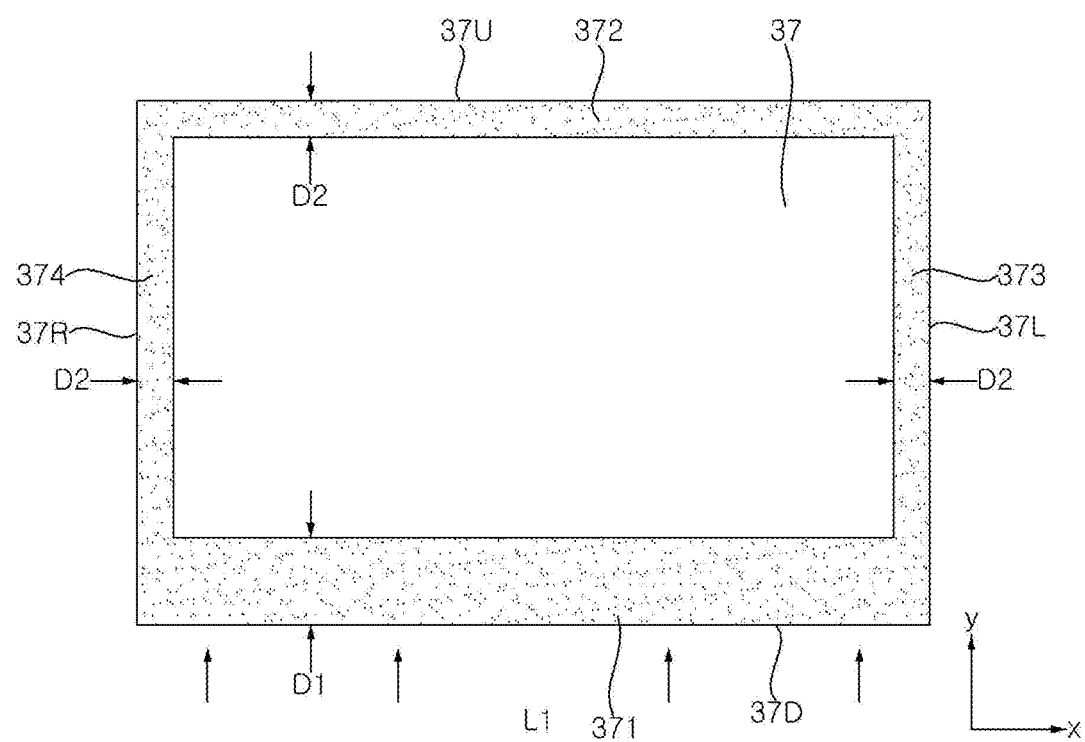

[FIG. 31]
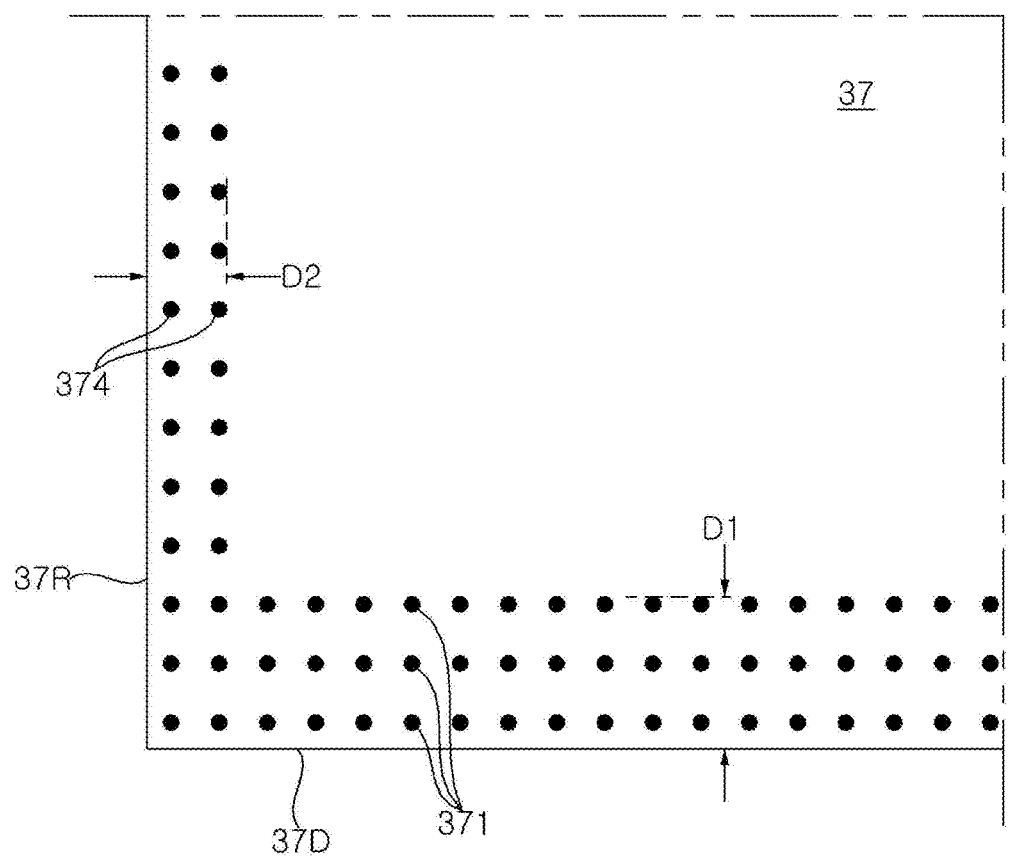

[FIG. 32]
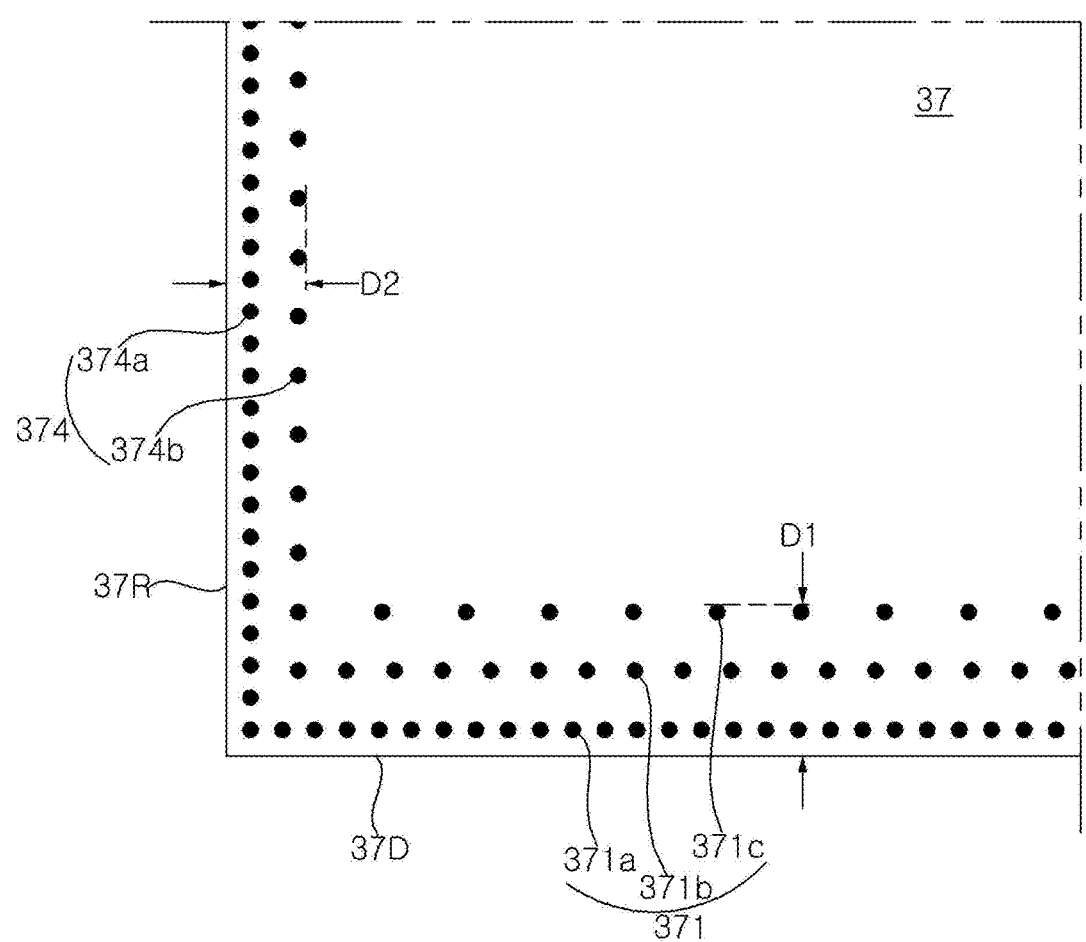

[FIG. 33]
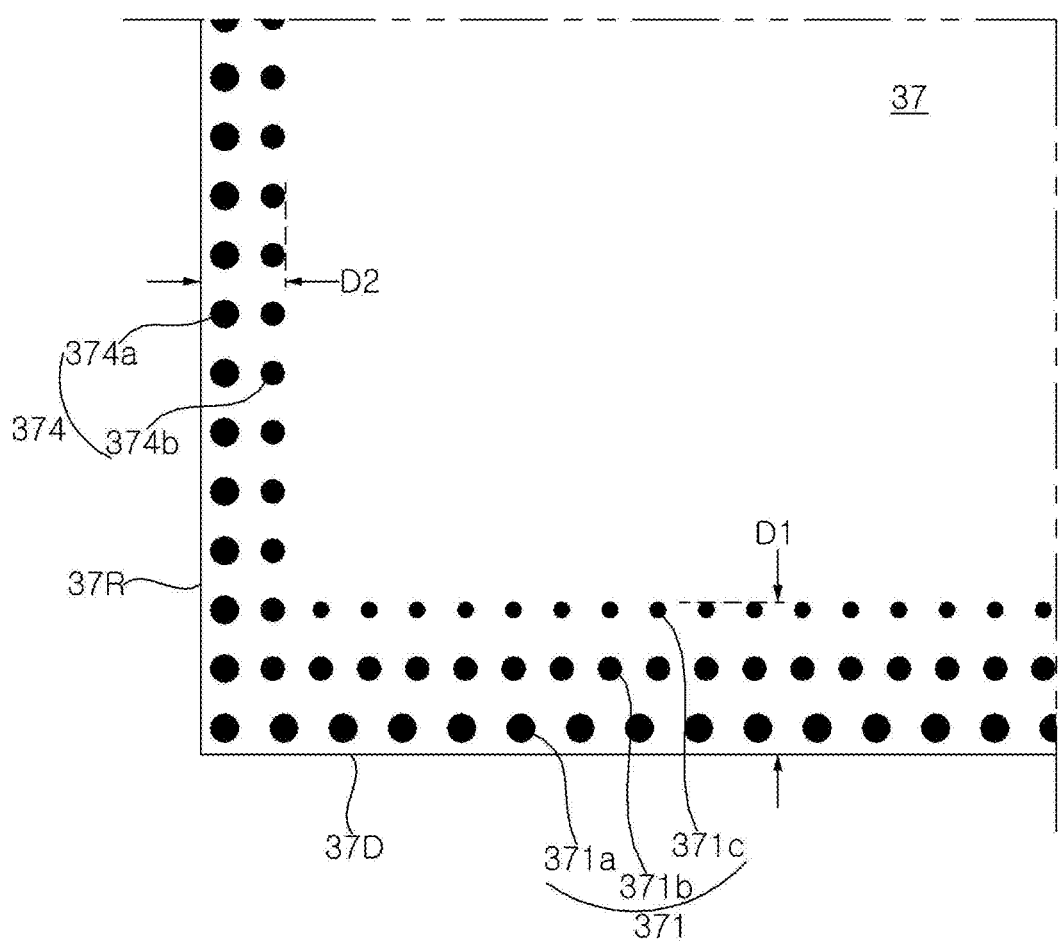

[FIG. 34]
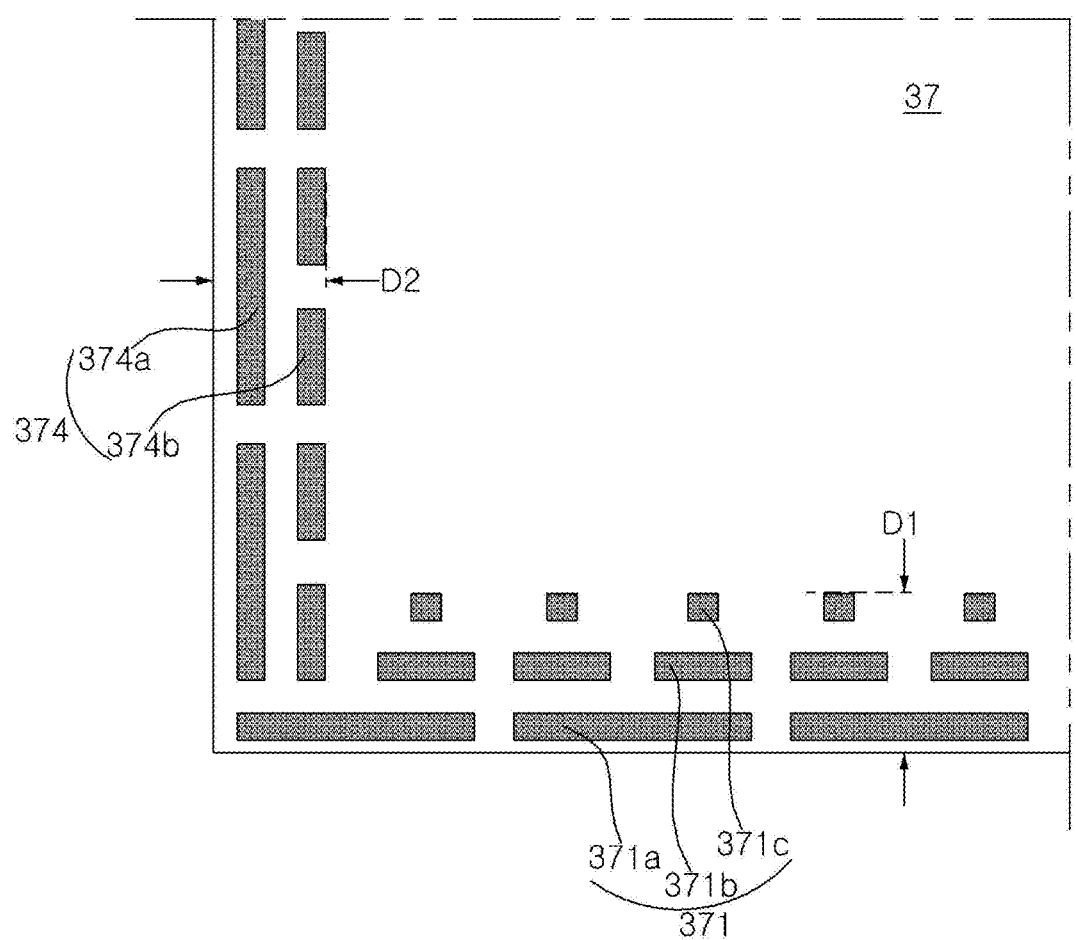

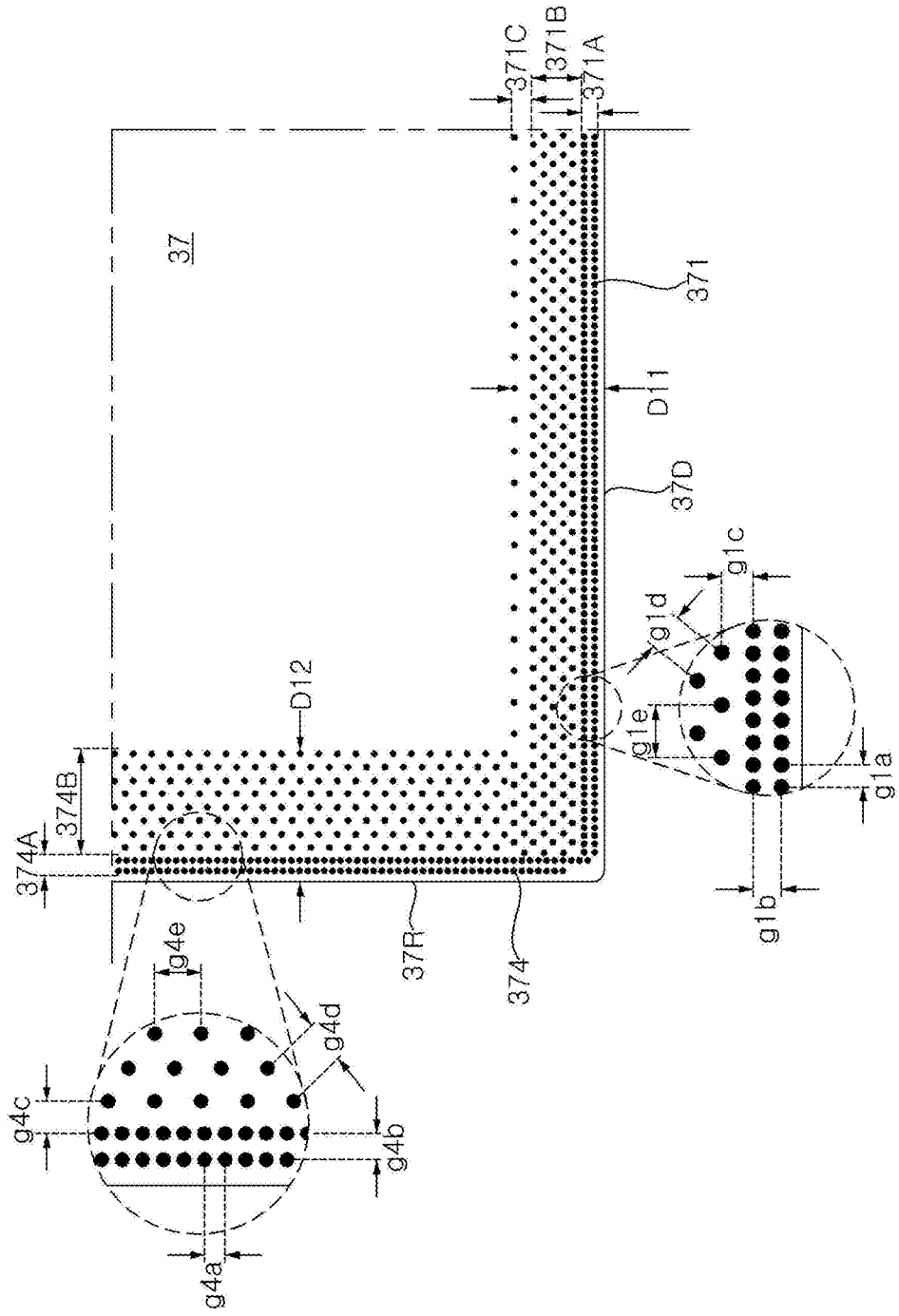
[FIG. 35]

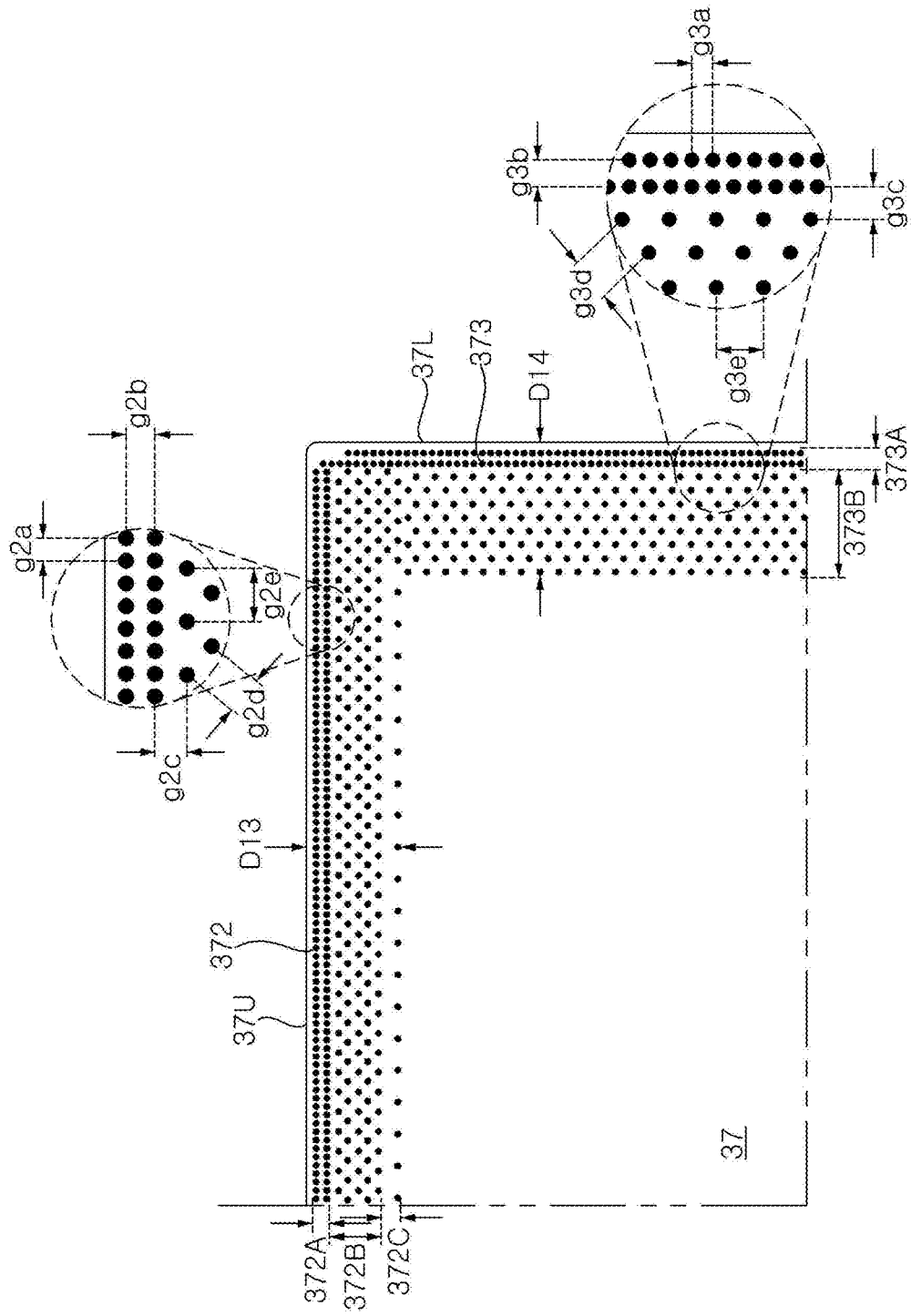
[FIG. 36]

[FIG. 37]
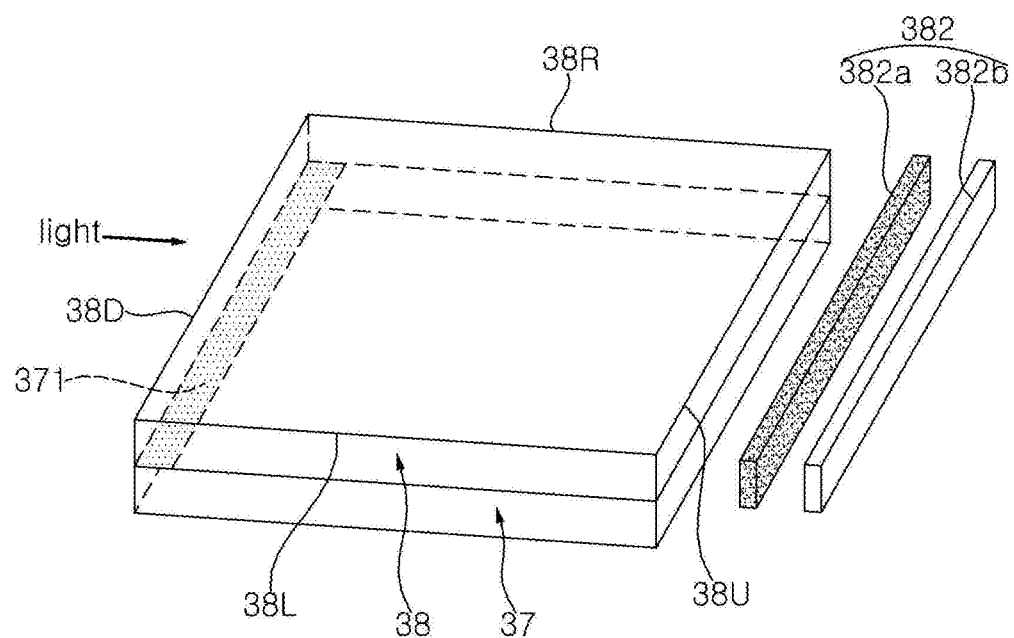

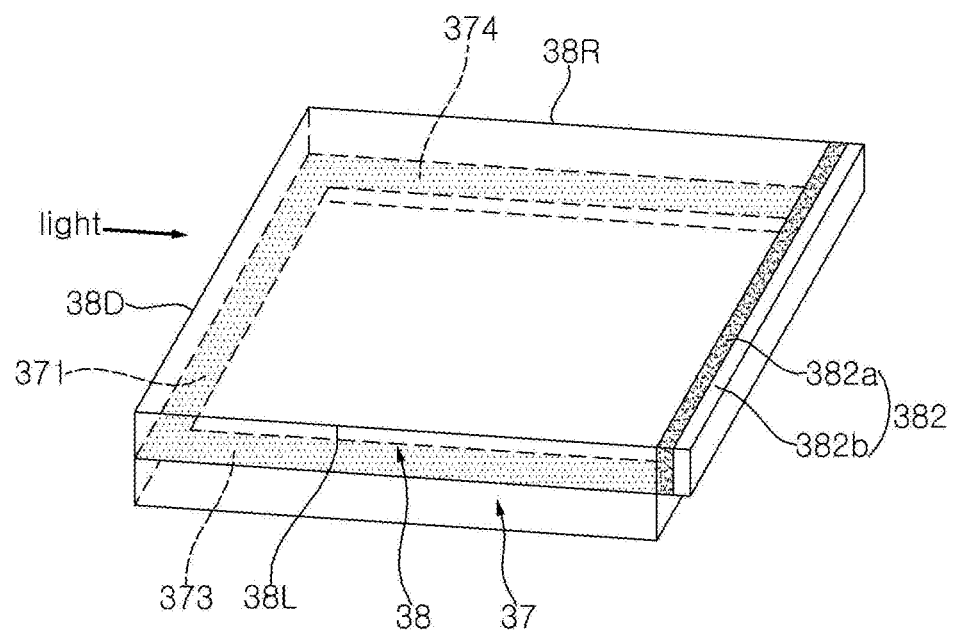
[FIG. 38]

[FIG. 39]
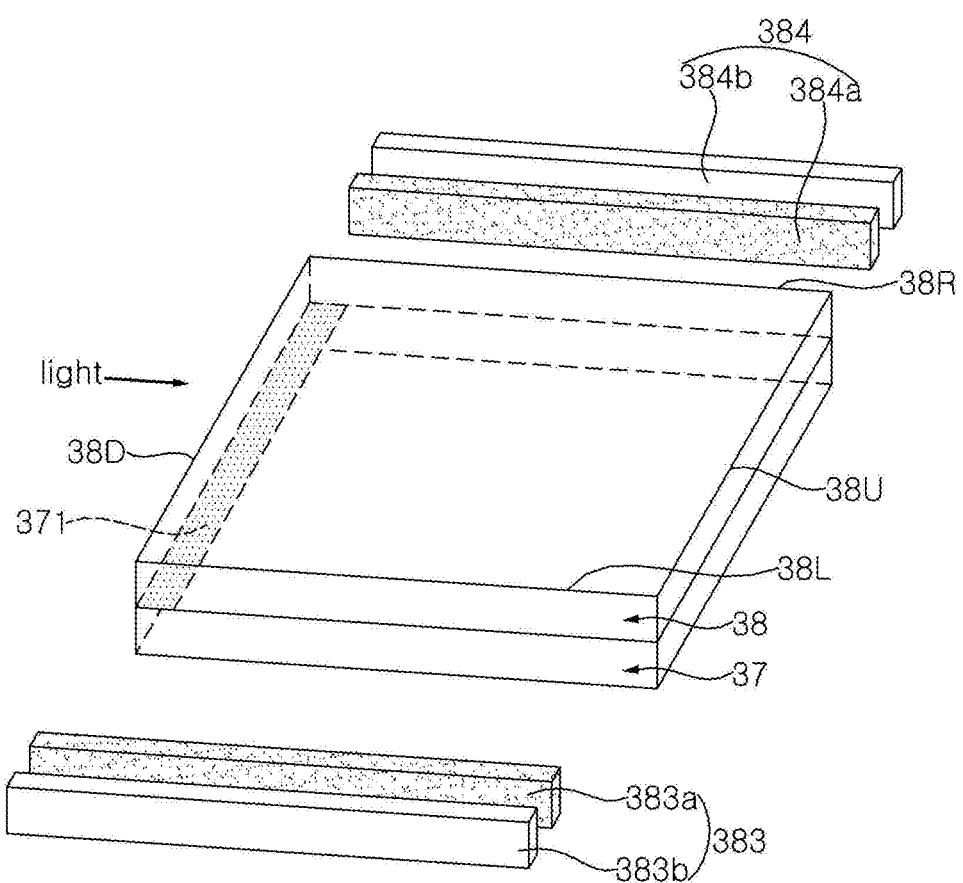

[FIG. 40]
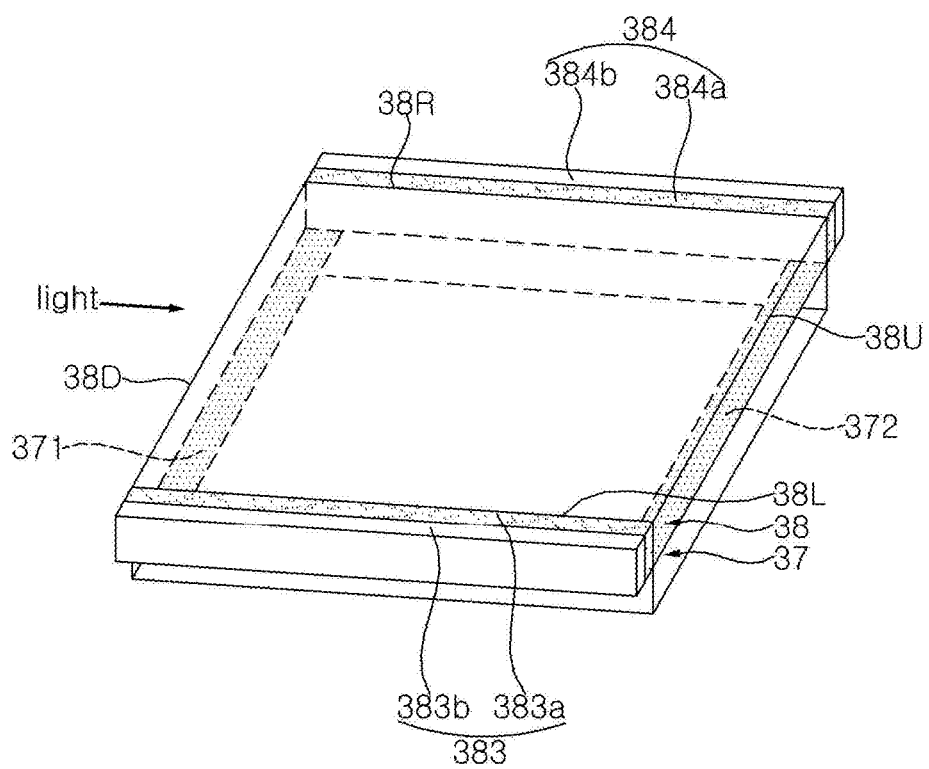

[FIG. 41]
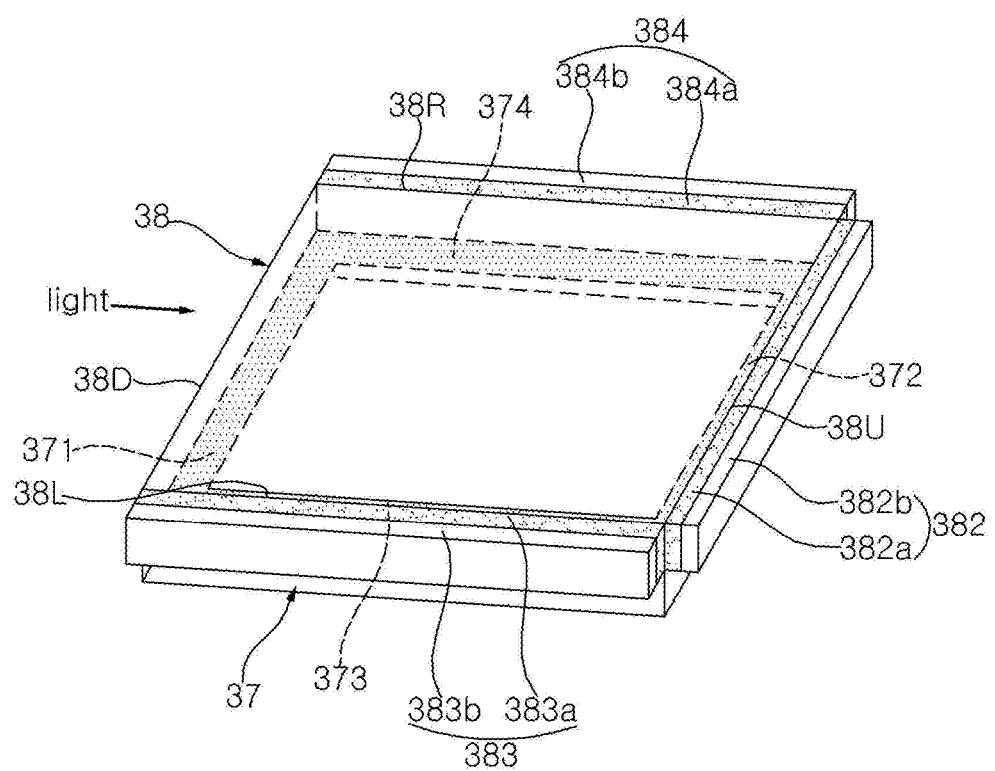

DISPLAY DEVICE INCLUDING LIGHT-ABSORBING LAYER WITH PHOSPHOR FOR LIGHT CONVERSION

CROSS-REFERENCE TO RELATED APPLICATION(S)

This application is the National Stage filing under 35 U.S.C. 371 of International Application No. PCT/KR2022/013858, filed on Sep. 16, 2022, which claims the benefit of earlier filing date and right of priority to Korean Application No. 10-2022-0035458 filed on Mar. 22, 2022, the contents of which are all hereby incorporated by reference herein in their entireties.

TECHNICAL FIELD

The present disclosure relates to a display device.

BACKGROUND ART

With the development of the information society, there have been growing demands for various types of display devices, and in order to meet these demands, various display devices, such as a liquid crystal display (LCD) device, a Plasma Display Panel (PDP), an electroluminescent display (ELD), a vacuum fluorescent display (VFD), an organic light emitting diode (OLED), etc., have been studied and used recently.

Among them, the LCD panel includes a TFT substrate and a color substrate which are positioned opposite each other with a liquid crystal layer interposed therebetween, and displays images by using light provided by a backlight unit.

Recently, as interest in image quality of a display device increases, color expressiveness or color reproducibility close to true color has received considerable attention, and many studies are being conducted to improve the image quality to realize true color.

DETAILED DESCRIPTION OF INVENTION

Technical Problems

It is an objective of the present disclosure to solve the above and other problems.

Another objective may be to provide a display device capable of improving image quality.

Another objective may be to provide a display device capable of improving color reproducibility.

Another objective may be to provide a display device capable of minimizing color difference that occurs in the vicinity of the edge of a display panel.

Another objective may be to provide a display device capable of reducing costs by reducing the amount of required phosphors.

Technical Solution

In accordance with an aspect of the present disclosure for achieving the above and other objectives, a display device may include: a display panel; a light guide plate positioned behind the display panel; a reflective sheet positioned behind the light guide plate; a light-absorbing layer positioned between the light guide plate and the display panel and absorbing light within a certain wavelength range; an optical assembly providing light to one side of the light guide plate; and a side reflector positioned at the other side of the light guide plate, including a reflecting material, and having a specific color.

In accordance with another aspect of the present disclosure, a display device may include: a display panel; an optical assembly providing light to the display panel; and a light-absorbing layer positioned in a path of light provided from the optical assembly to the display panel, and including a phosphor, wherein the optical assembly may include: a light source providing blue-based light; an encapsulant covering a perimeter of the light source; and a phosphor disposed in the encapsulant, wherein any one of the phosphor of the light-absorbing layer and the phosphor of the optical assembly may be a red phosphor, and a remaining one may be a green phosphor.

Effect of Invention

The display device according to the present disclosure has the following effects.

According to at least one of the embodiments of the present disclosure, a display device capable of improving image quality may be provided.

According to at least one of the embodiments of the present disclosure, a display device capable of improving color reproducibility may be provided.

According to at least one of the embodiments of the present disclosure, there may be provided a display device capable of minimizing color difference that occurs in the vicinity of the edge of a display panel.

According to at least one of the embodiments of the present disclosure, there may be provided a display device capable of reducing costs by reducing the amount of required phosphors.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

BRIEF DESCRIPTION OF THE DRAWING

FIGS. 1 to 41 are diagrams illustrating examples of a display device according to embodiments of the present disclosure.

MODE FOR CARRYING OUT THE INVENTION

Hereinafter, the present disclosure will be described in detail with reference to the accompanying drawings, in which the same reference numerals are used throughout the drawings to designate the same or similar components, and a redundant description thereof will be omitted.

The suffixes, such as "module" and "unit," for elements used in the following description are given simply in view of the ease of the description, and do not have a distinguishing meaning or role.

In addition, it will be noted that a detailed description of known arts will be omitted if it is determined that the detailed description of the known arts can obscure the embodiments of the present disclosure. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A singular representation may include a plural representation unless context clearly indicates otherwise.

It should be understood that the terms "comprise," "include," "have," etc. when used in this specification, specify the presence of stated features, integers, steps, operations, elements, components, or combinations thereof but do not preclude the presence or addition of one or more other features, integers, steps, operations, elements, components, or combinations thereof.

References to directions, such as up (U), down (D), left (Le), right (Ri), front (F), and rear (R), shown in the drawings are provided merely for convenience of explanation and are not intended for limiting the scope of the present disclosure.

Referring to FIG. 1, a display device 1 may include a display panel 10. The display panel 10 may display an image.

The display device 1 may include a first long side LS1, a second long side LS2 opposite to the first long side LS1, a first short side SS1 adjacent to the first long side LS1 and the second long side LS2, and a second short side SS2 opposite to the first short side SS1. Meanwhile, for convenience of explanation, it is illustrated and described that the first and second long sides LS1 and LS2 are longer than the first and second short sides SS1 and SS2, but it is also possible that lengths of the first and second long sides LS1 and LS2 may be approximately equal to lengths of the first and second short sides SS1 and SS2.

A direction parallel to the long sides LS1 and LS2 of the display device 1 may be referred to as a left-right direction or a first direction DR1. A direction parallel to the short sides SS1 and SS2 of the display device 1 may be referred to as an up-down direction or a second direction DR2. A direction perpendicular to the long sides LS1 and LS2 and the short sides SS1 and SS2 of the display device 1 may be referred to as a front-rear direction or a third direction DR3.

A side on which the display panel 10 displays an image may be referred to as a front side F, z, and a side opposite thereto may be referred to as a rear side R. The first long side LS1 may be referred to as an upper side U, y, and the second long side LS2 may be referred to as a lower side D. The first short side SS1 may be referred to as a left side Le, x, and the second short side SS2 may be referred to as a right side Ri.

The first long side LS1, the second long side LS2, the first short side SS1, and the second short side SS2 may be referred to as edges of the display device 1. Further, positions where the first long side LS1, the second long side LS2, the first short side SS1, and the second short side SS2 meet each other may be referred to as corners.

For example, a position where the first short side SS1 and the first long side LS1 meet each other may be referred to as a first corner C1. A position where the first long side LS1 and the second short side SS2 meet each other may be referred to as a second corner C2. A position where the second short side SS2 and the second long side LS2 meet each other may be referred to as a third corner C3. A position where the second long side LS2 and the first short side SS1 meet each other may be referred to as a fourth corner C4.

Referring to FIG. 2, the display device 1 may include the display panel 10, a front cover 15, a guide panel 13, a backlight unit 20, a frame 60, and a back cover 70.

The display panel 10 may form a front surface of the display device 1 and may display an image. The display panel 10 may display an image in such a manner that a plurality of pixels output red, green, or blue (RGB) for each pixel according to the timing. The display panel 10 may be divided into an active area, in which the image is displayed, and a de-active area in which the image is not displayed. The display panel 10 may include a front substrate and a rear substrate, which are disposed opposite each other, with a liquid crystal layer interposed therebetween. The display panel 10 may be referred to as an LCD panel 10.

The front substrate may include a plurality of pixels composed of red (R), green (G), and blue (B) subpixels. The front substrate may emit light corresponding to red, green, or blue color in response to a control signal.

The rear substrate may include switching elements. The rear substrate may switch on or off pixel electrodes. For example, the pixel electrode may change a molecular arrangement of a liquid crystal layer in response to a control signal received from the outside. The liquid crystal layer may include liquid crystal molecules. The arrangement of the liquid crystal molecules may change depending on a difference in voltage generated between the pixel electrode and a common electrode. The liquid crystal layer may allow or interrupt the transmission of the light from the backlight unit 20 to the front substrate.

The front cover 15 may cover at least a portion of the front surface or a side surface of the display panel 10. The front cover 15 may be divided into a front cover located on the front surface of the display panel 10, and a side cover located on the side surface of the display panel 10. The front cover and the side cover may be provided separately or may be formed as one body. At least one of the front cover and the side cover may be omitted. The front cover 15 may be referred to as a case top 15.

The guide panel 13 may surround a periphery of the display panel 10 and may cover the side surface of the display panel 10. The guide panel 13 may be coupled to the display panel 10 or may support the display panel 10. The guide panel 13 may be referred to as a panel guide or a side frame.

The backlight unit 20 may be disposed at the rear of the display panel 10. The backlight unit 20 may include a plurality of light sources. The backlight unit 20 may be coupled to the frame 60 at the front of the frame 60. The backlight unit 20 may be driven by a full driving scheme or a partial driving scheme such as local dimming, impulsive driving, or the like. The backlight unit 20 may include an optical sheet 40 and an optical layer 30.

The optical sheet 40 may evenly transmit light from the light source to the display panel 10. The optical sheet 40 may be composed of a plurality of layers. For example, the optical sheet 40 may include a prism sheet, a diffusion sheet, and the like. For example, the optical sheet 40 may be a Double Brightness Enhance Film (DBEF). Meanwhile, a coupling part 40d of the optical sheet 40 may be coupled to the front cover 15, the frame 60, or the back cover 70.

The frame 60 may be disposed at the rear of the backlight unit 20 and may support components of the display device 1. For example, components, such as the backlight unit 20, a printed circuit board (PCB) on which a plurality of electronic elements are disposed, etc., may be coupled to the frame 60. The frame 60 may be made of a metal material such as an aluminum alloy and the like. The frame 60 may be referred to as a main frame or a module cover.

The back cover 70 may cover the rear of the frame 60. The back cover 70 may be coupled to the frame 60 and/or the front cover 15. For example, the back cover 70 may be an injection-molded product of a resin material. In another example, the back cover 70 may include a metal material.

Meanwhile, a cable (not shown) may be electrically connected to the display panel 10 and a source PCB (not shown). The source PCB may be disposed at the rear of the frame 60.

Referring to FIGS. 3 and 4, the backlight unit 20 may include the optical layer 30 and the optical sheet 40. The optical layer 30 may include a substrate 32, at least one light source 34, a reflective sheet 36, and a diffusion plate 39.

The substrate 32 may be coupled to a front surface of the frame 60. The substrate 32 may have a plate shape or may have a plurality of straps that are vertically spaced apart from each other. The substrate 32 may be made of at least one of polyethylene terephthalate (PET), glass, polycarbonate (PC), and silicon. The substrate 32 may be a printed circuit board (PCB).

At least one light source 34 may be mounted on the substrate 32. A plurality of light sources 34 may be spaced apart from each other on the substrate 32. An electrode pattern for connecting an adapter and the light source 34 may be formed on the substrate 32. For example, a carbon nano tube (CNT) electrode pattern for connecting an adapter and the light source 34 may be formed on the substrate 32.

For example, the light source 34 may be a light emitting diode (LED) chip or an LED package including at least one LED chip. The light source 34 may be configured as a white LED or a colored LED emitting light of at least one of red, green, and blue color, and the like. The colored LED may include at least one of a red LED, a green LED, and a blue LED. The light source 34 may be referred to as an optical assembly 34.

The reflective sheet 36 may be disposed at the front of the substrate 32. The reflective sheet 36 may be disposed on a region of the substrate 32, except a region where the light source 34 is formed. The reflective sheet 36 may have a hole 36a in which the light source 34 is disposed.

Further, the reflective sheet 36 may include, as a reflective material, at least one of a metal and a metal oxide. For example, the reflective sheet 36 may include a highly reflective metal, such as at least one of aluminum (Al), silver (Ag), gold (Au), or titanium dioxide (TiO2), and/or a metal oxide. For example, the resin may be deposited or applied on the light source 34 and/or the reflective sheet 36. The resin may serve to diffuse light from the light source 34. Accordingly, the reflective sheet 36 may reflect the light from the light source 34 or the light reflected from the diffusion plate 39 in a forward direction.

The diffusion plate 39 may be disposed at the front of the reflective sheet 36. The diffusion plate 39 may diffuse light from the light source 34. A spacer 36b may be disposed between the reflective sheet 36 and the diffusion plate 39 and may support a rear surface of the diffusion plate 39. Accordingly, an air gap may be formed between the reflective sheet 36 and the diffusion plate 39 and the light from the light source 34 may be spread widely by the air gap.

The optical sheet 40 may be disposed at the front of the diffusion plate 39. A rear surface of the optical sheet 40 may come into close contact with the diffusion plate 39, and a front surface of the optical sheet 40 may come into close contact with or may be adjacent to a rear surface of the display panel 110. The optical sheet 40 may include at least one sheet.

For example, the optical sheet 40 may include a plurality of sheets having different functions. A first optical sheet 40a may be a diffusion sheet, and a second optical sheet 40b and a third optical sheet 40c may be prism sheets. The diffusion sheet may prevent light, emitted from the diffusion plate 39, from being partially concentrated, thereby achieving more uniform distribution of light. The prism sheet may collect light from the diffusion plate 39 and may provide the light to the display panel 10. Meanwhile, the number and/or position of the diffusion sheet and the prism sheet may vary.

The coupling part 40d may be formed on at least one edge of the optical sheet 40. The coupling part 40d may be formed on at least one of the first optical sheet 40a, the second optical sheet 40b, or the third optical sheet 40c.

Referring to FIGS. 5 and 6, a backlight unit 20' may include an optical layer 30' and the optical sheet 40. The optical layer 30' may be disposed between the frame 60 and the display panel 10. The optical layer 30' may be supported by the frame 60. The optical layer 30' may include a substrate 32', at least one light source 34', a reflective sheet 37, and a light guide plate 38.

The light guide plate 38 may be disposed between the frame 60 and the optical sheet 40 and may be supported by the frame 60. The light guide plate 38 may be referred to as an optical plate 38.

The substrate 32' may be adjacent to a periphery of the light guide plate 38 and may be coupled to one side of the guide panel 13. For example, the substrate 32' may be adjacent to a lower side of the light guide plate 38. The substrate 32' may be made of at least one of polyethylene terephthalate (PET), glass, polycarbonate (PC), and silicon. The substrate 32' may be a printed circuit board (PCB).

At least one light source 34' may be mounted on the substrate 32'. A plurality of light sources 34' may be spaced apart from each other on the substrate 32'. An electrode pattern for connecting an adapter and the light sources 34' may be formed on the substrate 32'. For example, a carbon nano tube electrode pattern for connecting the light sources 34' and an adapter may be formed on the substrate 32'.

For example, the light source 34' may be a light emitting diode (LED) chip or an LED package including at least one LED chip. The light source 34' may be configured as a white LED or a colored LED emitting light of at least one of red, green, and blue color, and the like. The colored LED may include at least one of a red LED, a green LED, and a blue LED. The light source 34' may be referred to as an optical assembly 34'.

The reflective sheet 37 may be disposed between the frame 60 and the light guide plate 38, and may be supported by the frame 60. The reflective sheet 37 may include, as a reflective material, at least one of a metal and a metal oxide. For example, the reflective sheet 37 may include a highly reflective metal, such as at least one of aluminum (Al), silver (Ag), gold (Au), or titanium dioxide (TiO2), and/or a metal oxide.

Accordingly, the light source 34' may provide light to the edge of the light guide plate 38. Light entering the light guide plate 38 may be directed forward by the light guide plate 38 and the reflective sheet 37.

Referring to FIGS. 7 and 8, the display panel 10 may include a front substrate 10a, a rear substrate 10b, a color filter 10c, and polarization films 10d and 10e. The color filter 10c may be disposed between the front substrate 10a and the rear substrate 10b. A first polarization film 10d may be positioned on a front surface of the front substrate 10a, and a second polarization film 10e may be positioned on a rear surface of the rear substrate 10b. The liquid crystal layer or the TFT may be positioned between the front substrate 10a and the rear substrate 10b, but a description thereof will be omitted.

The light sources 34 and 34' may provide light to the optical sheet 40. Light scattered to and/or concentrated onto the optical sheet 40 may be provided to the display panel 10. The display panel 10 may display an image using this light.

Further, light provided by the light sources 34 and 34' may be divided into light L1 before passing through the display panel 10, and light L2 after passing through the display panel 10. The light L1 and light L2 may have different spectra from each other.

In addition, FIG. 8 shows an example of the spectrum of light L1. The horizontal axis in FIG. 8 represents the wavelength (nm) of light and the vertical axis represents the intensity (radiant flux (W)) of light. In FIG. 8, B may represent the intensity or distribution of the blue-based light.

In this case, the light sources 34 and 34' may be LEDs. The light sources 34 and 34' may be blue LEDs. The light sources 34 and 34' may provide light L1 of the wavelength and/or intensity shown in FIG. 8. For example, the light sources 34 and 34' may provide blue-based light within a wavelength range of 430 nm to 465 nm. Meanwhile, by providing high-purity white light to the display panel 10, high-purity color (i.e., excellent color representation) and high image quality may be achieved in the display panel 10.

Referring to FIGS. 9 to 12, a light-absorbing layer 50 may be positioned in the path of light that is emitted from the light sources 34 and 34' toward the display panel 10. For example, the light-absorbing layer 50 may include a Quantum Dot (QD) Enhancement Film and/or Nano Organic Film (NOF).

Referring to FIG. 9, the light-absorbing layer 50 may face the light source 34. The light-absorbing layer 50 may be disposed on a rear surface of the optical sheet 40. The light-absorbing layer 50 may be adhered to or formed or deposited on a rear surface of the optical sheet 40.

Referring to FIG. 10, the light-absorbing layer 50 may be opposite to the light source 34 with respect to the optical sheet 40. The light-absorbing layer 50 may be disposed on a front surface of the optical sheet 40. The light-absorbing layer 50 may be adhered to or formed or deposited on the front surface of the optical sheet 40.

Referring to FIG. 11, the light-absorbing layer 50 may face a front surface of the light guide plate 38. The light-absorbing layer 50 may be disposed on the rear surface of the optical sheet 40. The light-absorbing layer 50 may be adhered to or formed or deposited on the rear surface of the optical sheet 40.

Referring to FIG. 12, the light-absorbing layer 50 may face the light guide plate 38 with respect to the optical sheet 40. The light-absorbing layer 50 may be disposed on the front surface of the optical sheet 40. The light-absorbing layer 50 may be adhered to or formed or deposited on the front surface of the optical sheet 40.

Referring to FIGS. 13 and 14, the light-absorbing layer 50 may be disposed between the light sources 34 and 34' and the display panel 10. The light-absorbing layer 50 may include a green phosphor GP and a red phosphor RP. For example, the green phosphor GP may be a particle (SrGa2S4:Eu) having a size of 3 to 7 micrometers, and the red phosphor RP may be a particle ((Sr,Ca)AlSiN3:Eu) having a size of 1 micrometer or less.

The light L1 from the light sources 34 and 34' may be, for example, blue-based light (see FIG. 8), and may excite the green phosphor GP. The light L1 from the light sources 34 and 34' may be, for example, blue-based light (see FIG. 8), and may excite the red phosphor RP. In this case, the light L1 from the light sources 34 and 34' may have optical characteristics that blue (B)-based light (see FIG. 8) has high intensity, and while passing through the light-absorbing layer 50, the light may be converted into light L2 in which green (G)-based light (see the solid line of FIG. 14) and red (R)-based light R (see the solid line of FIG. 14) have increased or enhanced intensity.

In other words, a portion of the light L1 from the light sources 34 and 34' may pass through the light-absorbing layer 50 without being absorbed into or reflected from the green phosphor GP and the red phosphor RP, so as to be emitted as blue (B)-based light, and may be mixed with the green (G)-based light and the red (R)-based light, emitted from the light-absorbing layer 50, to form white light L2.

Referring to FIGS. 15 and 16, the light-absorbing layer 50 may be disposed between the light sources 34 and 34' and the display panel 10. A first light-absorbing layer 50a may include a green phosphor GP, and a second light-absorbing layer 50b may include a red phosphor RP. Alternatively, the first light-absorbing layer 50a may include not only the green phosphor GP but also a certain proportion of the red phosphor RP. For example, the green phosphor GP may be a particle (SrGa2S4:Eu) having a size of 3 to 7 micrometers, and the red phosphor RP may be a particle ((Sr,Ca)AlSiN3:Eu) having a size of 1 micrometer or less.

The first light-absorbing layer 50a may be a quantum dot (QD) enhancement film including the green phosphor GP or including the green phosphor GP and the red phosphor RP. For example, the first light-absorbing layer 50a may have a thickness of about 90 micrometers. The first light-absorbing layer 50a may absorb blue-based light and emit green-based light. For example, the first light-absorbing layer 50a may absorb light within a wavelength range of 400 nm to 500 nm. For example, the first light-absorbing layer 50a may absorb light within a wavelength range of 434 nm to 461 nm.

The second light-absorbing layer 50b may be a nano organic material (NOM) film including the red phosphor RP. For example, the second light-absorbing layer 50b may have a thickness of about three micrometers. The second light-absorbing layer 50b may absorb green-based light and emit red-based light. For example, the second light-absorbing layer 50b may absorb light within a wavelength range of 500 nm to 600 nm. For example, the second light-absorbing layer 50b may absorb light within a wavelength range of 524 nm to 557 nm.

In addition, the first light-absorbing layer 50a may be adhered to the second light-absorbing layer 50b. For example, an adhesive may be applied to the first light-absorbing layer 50a which may be laminated on and adhered to the second light-absorbing layer 50b. The first light-absorbing layer 50a and the second light-absorbing layer 50b may be collectively referred to as a Nano Organic Film (NOF) 50 or a Hybrid NOF 50. Meanwhile, a rear layer 501 may be bonded or adhered to the first light-absorbing layer 50a, and a front layer 502 may be bonded or adhered to the second light-absorbing layer 50b. For example, the rear layer 501 and the front layer 502 may include PET material.

For example, the first light-absorbing layer 50a may be disposed between the light sources 34 and 34' and the display panel 10, and the second light-absorbing layer 50b may be disposed between the first light-absorbing layer 50a and the display panel 10. In another example, the second light-absorbing layer 50b may be disposed between the light sources 34 and 34' and the display panel 10, and the first light-absorbing layer 50a may be disposed between the second light-absorbing layer 50b and the display panel 10.

The light L1 from the light sources 34 and 34' may be, for example, blue-based light (see FIG. 8), and may excite the green phosphor GP. Light L0 excited in and emitted from the green phosphor GP may excite the red phosphor RP. In this case, the light L1 from the light sources 34 and 34' may have optical characteristics that blue (B)-based light (see FIG. 8) has high intensity, and while passing through the first light-absorbing layer 50a and the second light-absorbing layer 50b, the light may be converted into light L3 in which green (G)-based light (see the solid line of FIG. 16) and red (R)-based light R (see the solid line of FIG. 16) have increased or enhanced intensity.

In other words, a portion of the light L1 from the light sources 34 and 34' may pass through the first light-absorbing layer 50a and the second light-absorbing layer 50b without being absorbed into or reflected from the green phosphor GP and the red phosphor RP, so as to be emitted as blue (B)-based light, and may be mixed with the green (G)-based light and the red (R)-based light, emitted from the first light-absorbing layer 50a and the second light-absorbing layer 50b, to form white light L3.

Referring to FIG. 16, a dotted line shows a spectrum of light L2 provided to the display panel 10 by passing through the light-absorbing layer 50 described above with reference to FIG. 13, and a solid line shows a spectrum of light L3 provided to the display panel 10 by passing through the first light-absorbing layer 50a and the second light-absorbing layer 50b described above with reference to FIG. 15.

For example, the blue (B)-based light L1 from the light sources 34 and 34' may be absorbed into or reflected from the green phosphor GP while passing through the first light-absorbing layer 50a to excite the green phosphor GP, and the green phosphor GP may emit green (G)-based light L0. The green (G)-based light L0 emitted from the green phosphor GP in the first light-absorbing layer 50a may be absorbed into or reflected from the red phosphor RP while passing through the second light-absorbing layer 50b to excite the red phosphor RP, and the red phosphor RP may emit red (R)-based light. The light conversion may be repeated as light is recycled between the reflective sheets 36 (see FIGS. 9 and 10) and 37 (see FIGS. 11 and 12) and the optical sheet 40.

Accordingly, the full width at half maximum GW3 of the green (G)-based light of the light L3 (see FIG. 15) provided to the display panel 10 may be smaller than the full width at half maximum GW2 of the light L2 (see FIG. 13) provided to the display panel 10. Here, when the full width at half maximum of the green (G)-based light decreases, the purity of the green (G) color and color reproduction may be improved.

In addition, the full width at half maximum RW3 of the red (R)-based light of the light L3 (see FIG. 15) provided to the display panel 10 may be smaller than the full width at half maximum RW2 of the light L2 (see FIG. 13) provided to the display panel 10. Here, when the full width at half maximum of the red (R)-based light decreases, the purity of the red (R) color and color reproduction may be improved.

Referring to FIG. 17, the light L2 provided to the display panel 10 described above with reference to FIG. 13 is indicated by a dotted line in RGB color coordinates, and the light L3 provided to the display panel 10 described above with reference to FIG. 15 is indicated by a solid line in RGB color coordinates.

It can be seen that the green color coordinates of the light L3 (see FIG. 15) provided to the display panel 10 are closer to the boundary G than the green color coordinates of the light L2 (see FIG. 13) provided to the display panel 10. That is, the purity of the green color of the light L3 (see FIG. 15) provided to the display panel 10 may be improved, indicating that color reproduction of the light L3 provided to the display panel 10 is further improved.

Referring to FIG. 18, a concentration of the green phosphor GP in the first light-absorbing layer 50a' may be reduced. For example, the concentration of the green phosphor GP in the first light-absorbing layer 50a' may be 50% to 55% lower than the concentration of the green phosphor GP in the first light-absorbing layer 50a (see the top view of FIG. 18) described above with reference to FIG. 15. For example, the concentration of the green phosphor GP in the first light-absorbing layer 50a' may be 45% of the concentration of the green phosphor GP in the first light-absorbing layer 50a (see the top view of FIG. 18) described above with reference to FIG. 15. In this case, the light-absorbing layer 50' may be referred to as the low-concentration light-absorbing layer 50' or a low-concentration Hybrid NOF 50'.

Referring to FIGS. 18 and 19, a dotted line of FIG. 19 shows a spectrum of the light L3 provided to the display panel 10 by passing through the light-absorbing layer 50, i.e., Hybrid NOF 50, described above with reference to the top view of FIG. 18, and a solid line of FIG. 19 shows a spectrum of light L3' provided to the display panel 10 by passing through the low-concentration light-absorbing layer 50', i.e., low-concentration Hybrid NOF 50', described above with reference to the bottom view of FIG. 18.

For example, the blue (B)-based light L1 from the light sources 34 and 34' may be absorbed into or reflected from the green phosphor GP while passing through the first light-absorbing layer 50a' to excite the green phosphor GP, and the green phosphor GP may emit green (G)-based light. The green (G)-based light emitted from the green phosphor GP in the first light-absorbing layer 50a' may be absorbed into or reflected from the red phosphor RP while passing through the second light-absorbing layer 50b to excite the red phosphor RP, and the red phosphor RP may emit red (R)-based light. The light conversion may be repeated as light is recycled between the reflective sheets 36 (see FIGS. 9 and 10) and 37 (see FIGS. 11 and 12) and the optical sheet 40.

In this case, as the low-concentration green phosphor GP is included in the first light-absorbing layer 50a', a light conversion rate of the low-concentration light-absorbing layer 50' may be lower than a light conversion rate of the light-absorbing layer 50.

Accordingly, compared to the case where the light L1 from the light sources 34 and 34' passes through the light-absorbing layer 50, if the light L1 from the light sources 34 and 34' passes through the low-concentration light-absorbing layer 50', the intensity of blue (B)-based light may increase or may be enhanced, and the intensity of green (G)-based light and red (R)-based light may be reduced or weakened. In this case, color temperature of an image provided on the front surface of the display panel 10 may be 15,000 K to 18,000 K.

Referring to FIG. 20, a phosphor 34c may be disposed around the light sources 34 and 34'. For example, the phosphor 34c may be in powder form. The light sources 34 and 34' and the phosphor 34c may be collectively referred to as optical assemblies 34, 34', and 34c.

For example, an encapsulant 34b may contain the phosphor 34c and may cover the light sources 34 and 34'. The liquid encapsulant 34b mixed with the phosphor 34c may cover the light sources 34 and 34' and may be cured.

In another example, the housing 34a may have a concave accommodation space in which the light sources 34 and 34' are disposed. The encapsulant 34b may contain the phosphor 34c. The liquid encapsulant 34b mixed with the phosphor 34c may fill the accommodation space of the housing 34a and may be cured, and may cover the light sources 34 and 34'.

Light from the light sources 34 and 34' may be blue-based light. For example, the light sources 34 and 34' may be blue LEDs. The phosphor 34c may be yellow-based and/or based on color (alpha) other than yellow. The phosphor 34c may include a yellow phosphor YP and a red phosphor AP. For example, the yellow phosphor YP may be Yttrium Aluminum Garnet (YAG), La3Si6N11, LuAG(Al5Lu3O12), or Silicate. For example, the red phosphor AP may be (Sr,Ca)AlSiN3:Eu or (Sr, Ca, Ba)2SiN8:Eu.

For example, in the phosphor 34c, a proportion of the yellow phosphor YP may be 42% to 62% and a proportion of the red phosphor AP may be 37% to 57%, and the phosphors YP and AP may be added and mixed at 100% within the above percentage range.

For example, the content ratio of the red phosphor AP to the yellow phosphor YP may range from 0.71 to 0.93.

For example, the content of the phosphors YP and AP to the encapsulant 34b may range from 5% to 10%. The encapsulant 34b may include a silicone material. Meanwhile, in comparison to the above, if the content of the phosphors YP and AP is 25%, the light sources 34 and 34' and the phosphors YP and AP may form a white LED assembly.

Accordingly, the blue-based light from the light sources 34 and 34' may be absorbed into or reflected from the phosphors YP and AP to excite the phosphors YP and AP, and the phosphors YP and AP may emit yellow-based and/or red-based light.

Referring to FIGS. 20 and 21, a dotted line of FIG. 21 shows a spectrum of light L3' provided to the display panel 10 when the blue-based light from the light sources 34 and 34' passes through the low-concentration light-absorbing layer 50', i.e., low-concentration Hybrid NOF 50', described above with reference to the bottom view of FIG. 18. In addition, a solid line of FIG. 21 shows a spectrum of light L3" provided to the display panel 10 when light L1' emitted as blue-based light from the light sources 34 and 34' and having passed through the phosphor 34c and the encapsulant 34b passes through the low-concentration light-absorbing layer 50', i.e., low-concentration Hybrid NOF 50'.

For example, the light L1', emitted as blue (B)-based light from the light sources 34 and 34' and having passed through the phosphor 34c and the encapsulant 34b, is absorbed into or reflected from the green phosphor GP while passing through the first light-absorbing layer 50a' to excite the green phosphor GP, and the green phosphor GP may emit green (G)-based light. The green (G)-based light L0' emitted from the green phosphor GP in the first light-absorbing layer 50a' may be absorbed into or reflected from the red phosphor RP while passing through the second light-absorbing layer 50b to excite the red phosphor RP, and the red phosphor RP may emit red (R)-based light. The light conversion may be repeated as light is recycled between the reflective sheets 36 (see FIGS. 9 and 10) and 37 (see FIGS. 11 and 12) and the optical sheet 40.

Accordingly, compared to the case where the light from the light sources 34 and 34' does not pass through the phosphor 34c and the encapsulant 34b, if the light from the light sources 34 and 34' passes through the phosphor 34c and the encapsulant 34b, the light L3" provided to the display panel 10 by passing through the low-concentration Hybrid NOF 50' may include blue (B)-based light with an intensity that is reduced or weakens, and green (G)-based light and red (R)-based light with an intensity that increases or is enhanced.

For example, the wavelength of a peak (center) region of the blue (B)-based light may be 443 nm to 450 nm. For example, the wavelength of a peak (center) region of the green (G)-based light may be 530 nm to 550 nm. For example, the wavelength of a peak (center) region of the red (R)-based light may be, for example, 610 nm to 630 nm.

The light L3" may be emitted as white light. In addition, a color temperature of an image on the front of the display panel 10 may be 8,000 K to 12,000 K.

Further, an intensity of the green (G)-based light may be 20% to 70% of an intensity of blue (B)-based light provided to the display panel 10. An intensity of the red (R)-based light may be 20% to 70% of the intensity of the blue (B)-based light.

For example, the intensity of the green (G)-based light may be 35% to 40% of the intensity of the blue (B)-based light provided to the display panel 10. The intensity of the red (R)-based light may be 21% to 28% of the intensity of the blue (B)-based light.

In another example, the intensity of the green (G)-based light may be 37% of the intensity of blue (B)-based light provided to the display panel 10. The intensity of the red (R)-based light may be 25% of the intensity of the (B)-based light provided to the display panel 10.

Referring to FIG. 22, a light-absorbing layer 50" may be disposed between the light sources 34 and 34' and the display panel 10. The light-absorbing layer 50" may include a red phosphor RP. For example, the red phosphor RP may be a particle ((Sr,Ca)AlSiN3:Eu) having a size of 1 micrometer or less.

The light-absorbing layer 50" may include a Quantum Dot (QD) Enhancement Film containing the red phosphor RP. The light-absorbing layer 50" may absorb green-based light and emit red-based light. The light-absorbing layer 50" may be referred to as a red QD film. For example, the light-absorbing layer 50" may absorb light within a wavelength range of 500 nm to 600 nm. For example, the light-absorbing layer 50" may absorb light within a wavelength range of 524 nm to 557 nm. Meanwhile, the rear layer 501 may be bonded or adhered to a rear surface of the light-absorbing layer 50", and the front layer 502 may be bonded or adhered to a front surface of the light-absorbing layer 50". For example, the rear layer 501 and the front layer 502 may include PET material.

A phosphor 34c' may be disposed around the light sources 34 and 34'. For example, the phosphor 34c may be in powder form. The light sources 34 and 34' and the phosphor 34c' may be collectively referred to as optical assemblies 34, 34', and 34c'.

For example, the encapsulant 34b may contain the phosphor 34c' and may cover the light sources 34 and 34'. The liquid encapsulant 34b mixed with the phosphor 34c' may cover the light sources 34 and 34' and may be cured.

In another example, the housing 34a may have a concave accommodation space in which the light sources 34 and 34' are disposed. The encapsulant 34b may contain the phosphor 34c'. The liquid encapsulant 34b mixed with the phosphor 34c' may fill the accommodation space of the housing 34a and may be cured, and may cover the light sources 34 and 34'.

Light from the light sources 34 and 34' may be blue-based light. For example, the light sources 34 and 34' may be blue LEDs. The phosphor 34c' may include the green phosphor GP. For example, the green phosphor GP may be SrGa2S4:Eu or β-SiAlon.

Accordingly, the blue-based light from the light sources 34 and 34' may be absorbed into or reflected from the green phosphor GP to excite the green phosphor GP, and the green phosphor GP may emit green-based light.

The light L1" (particularly, the green-based light) emitted as the blue (B)-based light from the light sources 34 and 34' and having passed through the encapsulant 34b may be absorbed into or reflected from the red phosphor RP while passing through the light-absorbing layer 50b" to excite the red phosphor RP, and the red phosphor RP may emit red-based light. The light conversion may be repeated as light is recycled between the reflective sheets 36 (see FIGS. 9 and 10) and 37 (see FIGS. 11 and 12) and the optical sheet 40.

In this case, a portion of the light from the light sources 34 and 34' may pass through the light-absorbing layer 50" without being absorbed into or reflected from the green phosphor GP and the red phosphor RP, so as to be emitted as blue-based light, and may be mixed with the green-based light and the red-based light, emitted from the green phosphor GP and the red phosphor RP, to form white light L3".

Accordingly, compared to the case where the green phosphor is included in the light-absorbing layer, if the green phosphor GP is included in the optical assemblies 34, 34', and 34c', it is possible to reduce the amount of green phosphor GP contained in the display device, thereby reducing material costs.

Meanwhile, unlike the above, the light-absorbing layer 50" may include the green phosphor GP instead of the red phosphor RP, and the phosphor 34c' may include the red phosphor RP instead of the green phosphor GP. In this case, the light sources 34 and 34' may emit blue-based light, and the light L3'" provided to the display panel 10 by passing through the light-absorbing layer 50" may be white light.

Accordingly, compared to the case where the red phosphor is included in the light-absorbing layer, if the red phosphor RP is included in the optical assemblies 34, 34', and 34c', it is possible to reduce the amount of red phosphor RP contained in the display device, thereby reducing material costs.

Referring to FIG. 23, a light-absorbing layer 50" may be disposed between the light sources 34 and 34' and the display panel 10. A first light-absorbing layer 50a" may include a red phosphor RP, and a second light-absorbing layer 50b" may include a red phosphor RP. For example, the red phosphor RP may be a particle ((Sr,Ca)AlSiN3:Eu) having a size of 1 micrometer or less.

The first light-absorbing layer 50a" may be a Quantum Dot (QD) Enhancement Film containing the red phosphor RP. The first light-absorbing layer 50a" may absorb green-based light and emit red-based light. The light-absorbing layer 50" may be referred to as a red QD film. For example, the first light-absorbing layer 50a" may absorb light within a wavelength range of 500 nm to 600 nm. For example, the first light-absorbing layer 50a" may absorb light within a wavelength range of 524 nm to 557 nm.

The second light-absorbing layer 50b may be a Nano Organic Material (NOM) Film containing the red phosphor RP. The second light-absorbing layer 50b may absorb green-based light and emit red-based light. For example, the second light-absorbing layer 50b may absorb light within a wavelength range of 500 nm to 600 nm. For example, the second light-absorbing layer 50b may absorb light within a wavelength range of 524 nm to 557 nm.

In addition, the second light-absorbing layer 50b may be adhered to the first light-absorbing layer 50a". For example, an adhesive may be applied to the first light-absorbing layer 50a" which may be laminated on and adhered to the second light-absorbing layer 50b. The first light-absorbing layer 50a" and the second light-absorbing layer 50b may be collectively referred to as a red NOF 50'" or a red Hybrid NOF 50". Meanwhile, a rear layer 501 may be bonded or adhered to the first light-absorbing layer 50a", and a front layer 502 may be bonded or adhered to the second light-absorbing layer 50b. For example, the rear layer 501 and the front layer 502 may include PET material.

For example, the first light-absorbing layer 50a" may be disposed between the light sources 34 and 34' and the display panel 10, and the second light-absorbing layer 50b may be disposed between the first light-absorbing layer 50a" and the display panel 10. In another example, the second light-absorbing layer 50b may be disposed between the light sources 34 and 34' and the display panel 10, and the first light-absorbing layer 50a" may be disposed between the second light-absorbing layer 50b and the display panel 10.

A phosphor 34c' may be disposed around the light sources 34 and 34'. For example, the phosphor 34c may be in powder form. The light sources 34 and 34' and the phosphor 34c may be collectively referred to as optical assemblies 34, 34', and 34c'.

For example, the encapsulant 34b may contain the phosphor 34c' and may cover the light sources 34 and 34'. The liquid encapsulant 34b mixed with the phosphor 34c' may cover the light sources 34 and 34' and may be cured.

In another example, the housing 34a may have a concave accommodation space in which the light sources 34 and 34' are disposed. The encapsulant 34b may contain the phosphor 34c'. The liquid encapsulant 34b mixed with the phosphor 34c' may fill the accommodation space of the housing 34a and may be cured, and may cover the light sources 34 and 34'.

Light from the light sources 34 and 34' may be blue-based light. For example, the light sources 34 and 34' may be blue LEDs. The phosphor 34c' may include the green phosphor GP. For example, the green phosphor GP may be SrGa2S4:Eu or β-SiAlon.

Accordingly, the blue-based light from the light sources 34 and 34' may be absorbed into or reflected from the green phosphor GP to excite the green phosphor GP, and the green phosphor GP may emit green-based light.

The light L1" (particularly, the green-based light) emitted as the blue (B)-based light from the light sources 34 and 34' and having passed through the encapsulant 34b may be absorbed into or reflected from the red phosphor RP while passing through the first light-absorbing layer 50a" and the second light-absorbing layer 50b to excite the red phosphor RP, and the red phosphor RP may emit red-based light. The light conversion may be repeated as light is recycled between the reflective sheets 36 (see FIGS. 9 and 10) and 37 (see FIGS. 11 and 12) and the optical sheet 40.

In this case, a portion of the light from the light sources 34 and 34' may pass through the light-absorbing layer 50" without being absorbed into or reflected from the green phosphor GP and the red phosphor RP, so as to be emitted as blue-based light, and may be mixed with the green-based light and the red-based light, emitted from the green phosphor GP and the red phosphor RP, to form white light L3".

Accordingly, compared to the case where the green phosphor is included in the light-absorbing layer, if the green phosphor GP is included in the optical assemblies 34, 34', and 34c', it is possible to reduce the amount of green phosphor GP contained in the display device, thereby reducing material costs.

Meanwhile, unlike the above, the first light-absorbing layer 50a" may include the green phosphor GP instead of the red phosphor RP, the second light-absorbing layer 50b may include the green phosphor GP instead of the red phosphor RP, and the phosphor 34c' may include the red phosphor RP instead of the green phosphor GP. In this case, the light sources 34 and 34' may emit blue-based light, and the light L3"" provided to the display panel 10 by passing through the light-absorbing layer 50''' may be white light.

Accordingly, compared to the case where the red phosphor is included in the light-absorbing layer, if the red phosphor RP is included in the optical assemblies 34, 34' and 34c', it is possible to reduce the amount of red phosphor RP contained in the display device, thereby reducing material costs.

Referring to FIGS. 23 and 24, a dotted line of FIG. 24 shows a spectrum of light L3" provided to the display panel 10 by passing through the low-concentration light-absorbing layer 50', i.e., the low-concentration Hybrid NOF 50', described above with reference to FIG. 20, and a solid line of FIG. 24 shows a spectrum of light L3"" provided to the display panel 10 by passing through the light-absorbing layer 50''', i.e., the red Hybrid NOF 50''', described above with reference to FIG. 23.

The light L1" (particularly, the green-based light) emitted as the blue-based light from the light sources 34 and 34' and having passed through the phosphor 34c' and the encapsulant 34b may be absorbed into or reflected from the red phosphor RP while passing through the first light-absorbing layer 50a" and the second light-absorbing layer 50b to excite the red phosphor RP, and the red phosphor RP may emit red-based light. The light conversion may be repeated as light is recycled between the reflective sheets 36 (see FIGS. 9 and 10) and 37 (see FIGS. 11 and 12) and the optical sheet 40.

Accordingly, the full width at half maximum of the red (R)-based light of the light L3"" (see FIG. 23) provided to the display panel 10 may be smaller than the full width at half maximum of the light L3" (see FIG. 20) provided to the display panel 10. Here, when the full width at half maximum of the red (R)-based light decreases, the purity of the red (R) color and color reproduction may be improved.

Referring to FIGS. 23 and 25, the light L3" provided to the display panel 10 by passing through the low-concentration light-absorbing layer 50', i.e., the low-concentration Hybrid NOF 50', described above with reference to FIG. 20 is indicated by a dotted line in RGB color coordinates, and the light L3"" provided to the display panel 10 by passing through the light-absorbing layer 50''', i.e., the red Hybrid NOF 50''', described above with reference to FIG. 23 is indicated by a solid line in RGB color coordinates.

It can be seen that the red color coordinates of the light L3"" (see FIG. 23) provided to the display panel 10 are closer to the boundary R than the red color coordinates of the light L3" (see FIG. 20) provided to the display panel 10. That is, the purity of the red color of the light L3"" (see FIG. 23) provided to the display panel 10 may be improved, indicating that color reproduction of the light L3"" provided to the display panel 10 is further improved.

Referring to FIGS. 26 to 28, the light conversion using the aforementioned light-absorbing layer 50''' may be repeated as light is recycled between the reflective sheet 37 and the optical sheet 40. However, a light conversion rate at a position adjacent to the edge of the light guide plate 38 may be lower than a light conversion rate at a position adjacent to the center of the light guide plate 38. That is, light which is not sufficiently converted into white light may be provided toward the display panel 10. In addition, light which is not sufficiently converted into white light may be provided toward the display panel 10 through a gap between a horizontal part 13H and the optical sheet 40 in the vicinity of the edge of the light guide plate 38.

Referring to FIGS. 26 and 27, the frame 60 may include a flat portion 61 and a bending portion 62. The flat portion 61 may form a front surface of the frame 60 and may be substantially flat. The bending portion 62 may be bent forward from the edge of the flat portion 61 and may extend along the edge of the flat portion 61. A pressed portion 61P may be formed by being pressed rearward from the flat portion 61.

The guide panel 13 may include a vertical part 13V and a horizontal part 13H. The vertical part 13V may extend along the bending portion 62 and may cover an outer part of the bending portion 62. The horizontal part 13H may extend from the vertical part 13V and between the display panel 10 and the light guide plate 38. A front pad FP may be disposed between the display panel 10 and the horizontal part 13H and may be bonded or adhered to the horizontal part 13H.

The housing 80 may include a rear part 81, a protruding part 82, and a side part 83. The rear part 81 may be disposed on the pressed part 61P. The protruding part 82 may protrude forward from a front surface of the rear part 81. The side part 83 may be bent from a lower side of the rear part 81 and between the bending portion 62 and the light guide plate 38. The housing 80 may include a metal material such as aluminum (Al), and may be referred to as a heat sink.

The substrate 32' may be coupled to the inside of the side part 83. The light source 34' may be mounted on the substrate 32' and may provide light to the lower side of the light guide plate 38.

The reflective sheet 37 may be disposed on a rear surface of the light guide plate 38 and may be supported by the protruding part 82 and the flat portion 61 of the frame 60. The light-absorbing layer 50 and the optical sheet 40 may be stacked on the front surface of the light guide plate 38.

Referring to FIG. 26, a first bending portion 62U may form the upper side of the frame 60 and may face the upper side of the light guide plate 38. A second bending portion 62D may form the lower side of the frame 60 and may be coupled to the side part 83 of the housing 80.

A first upper pad 90U may be disposed between the horizontal part 13H and the optical sheet 40 and may be bonded or adhered to the horizontal part 13H. The first upper pad 90U may be adjacent to the upper side of the optical sheet 40 and may be adjacent to or in contact with the optical sheet 40.

A first lower pad 90D may be disposed between the horizontal part 13H and the optical sheet 40 and may be bonded or adhered to the horizontal part 13H. The first lower pad 90D may be adjacent to the lower side of the optical sheet 40 and may be adjacent to or in contact with the optical sheet 40.

A second pad 91 may be disposed between the horizontal part 13H and the light guide plate 38 and may be disposed between the lower side of the optical sheet 40 and the side part 83. The second pad 91 may be bonded or adhered to the horizontal part 13H and may be adjacent to or in contact with the front surface of the light guide plate 38.

The first upper pad 90U, the first lower pad 90D, and the second pad 91 may be positioned in the path of light emitted by the light source 34'.

Referring to FIG. 27, a third bending portion 62L may form the left side of the frame 60 and may face the left side of the light guide plate 38. A fourth bending portion 62R may form the right side of the frame 60 and may face the right side of the light guide plate 38.

A first left pad 90L may be disposed between the horizontal part 13H and the optical sheet 40 and may be bonded or adhered to the horizontal part 13H. The first left pad 90L may be adjacent to the left side of the optical sheet 40 and may be adjacent to or in contact with the front surface of the optical sheet 40.

A first right pad 90R may be disposed between the horizontal part 13H and the optical sheet 40 and may be bonded or adhered to the horizontal part 13H. The first right pad 90R may be adjacent to the right side of the optical sheet 40 and may be adjacent to or in contact with the front surface of the optical sheet 40.

The first left pad 90L and the first right pad 90R may be positioned in the path of light emitted by the light source 34'.

The first pad 90: 90U, 90D, 90L, and 90R and the second pad 91 which are described above may include a phosphor layer.

For example, the light source 34' may emit blue-based light, and the green phosphor GP (see FIGS. 22 and 23) may be disposed around the light source 34'. In this case, the phosphor layer may include a red phosphor. For example, the red phosphor in the phosphor layer may be (Sr,Ca)AlSiN3:Eu or (Sr, Ca, Ba)2SiN8:Eu.

For example, the light source 34' may emit blue-based light, and the red phosphor RP (see the description of FIGS. 22 and 23) may be disposed around the light source 34'. In this case, the phosphor layer may include a green phosphor. For example, the green phosphor in the phosphor layer may be SrGa2S4:Eu or β-SiAlon.

Accordingly, light which is not sufficiently converted in the vicinity of the edge of the light guide plate 38, may be converted into white light while passing through the first pad 90 and the second pad 91.

Referring to FIGS. 28 and 29, a first optical pattern 371 may be disposed between the light guide plate 38 and the reflective sheet 37, and may be adjacent to the lower side of the light guide plate 38. For example, the first optical pattern 371 may be formed on a front surface of the reflective sheet 37. In another example, the first optical pattern 371 may be formed on a rear surface of the light guide plate 38. In yet another example, the first optical pattern 371 may be formed on the front surface of the reflective sheet 37 and the rear surface of the light guide plate 38.

The first optical pattern 371 may be a set of identical or similar figures that are repeatedly arranged. Alternatively, the first optical pattern 371 may be a single band that defines the entire area of the first optical pattern 371. The color exhibited by the first optical pattern 371 may be a complementary color to the color of light emitted by the light source 34' and incident on the light guide plate 38.

For example, the light source 34' may emit blue-based light. In addition, a yellow phosphor may be disposed around the light source 34'. In this case, the first optical pattern 371 may include a yellow pigment. Alternatively, the first optical pattern 371 may include a yellow phosphor. For example, the yellow phosphor in the first optical pattern 371 may be Yttrium Aluminum Garnet (YAG), La3Si6N11, LuAG(Al5Lu3O12), or Silicate.

For example, the light source 34' may emit blue-based light, and the green phosphor GP (see FIGS. 22 and 23) may be disposed around the light source 34'. In this case, the first optical pattern 371 may include a red pigment. Alternatively, the first optical pattern 371 may include a red phosphor or a yellow phosphor. For example, the red phosphor in the first optical pattern 371 may be (Sr,Ca)AlSiN3:Eu or (Sr, Ca, Ba)2SiN8:Eu, and the yellow phosphor in the first optical pattern 371 may be Yttrium Aluminum Garnet (YAG), La3Si6N11, LuAG(Al5Lu3O12), or Silicate.

For example, the light source 34' may emit blue-based light, and the red phosphor RP (see the description of FIGS. 22 and 23) may be disposed around the light source 34'. In this case, the first optical pattern 371 may include a green pigment. Alternatively, the first optical pattern 371 may include a green phosphor. For example, the green phosphor in the first optical pattern 371 may be SrGa2S4:Eu or β-SiAlon.

Accordingly, the first optical pattern 371 may compensate for insufficient light conversion in the vicinity of the edge of the light guide plate 38, and as a result, light which is sufficiently converted into white light may also be provided to an outer part of the display panel 10.

In this case, the first optical pattern 371 may extend along a lower side 37D of the reflective sheet 37.

Preferably, the first optical pattern 371 may overlap the first lower pad 90D and the second pad 91 in a front-rear direction. In other words, a lower end of the first optical pattern 371 may be disposed parallel to or below a lower end of the second pad 91, and an upper end of the first optical pattern 371 may be disposed parallel to or above an upper end of the first lower pad 90D. In addition, a width D1 of the first optical pattern 371 may be equal to or greater than a sum of a width of the second pad 91 and a width of the first lower pad 90D.

Accordingly, the first optical pattern 371 may compensate for insufficient light conversion in the vicinity of the edge of the light guide plate 38.

Referring to FIGS. 28 and 30, second optical patterns 372, 373, and 374 may be disposed between the light guide plate 38 and the reflective sheet 37, and may be adjacent to the upper side, the left side, and/or the right side of the light guide plate 38. For example, the second optical patterns 372, 373, and 374 may be formed on the front surface of the reflective sheet 37. In another example, the second optical patterns 372, 373, and 374 may be formed on the rear surface of the light guide plate 38. In yet another example, the second optical patterns 372, 373, and 374 may be formed on the front surface of the reflective sheet 37 and the rear surface of the light guide plate 38.

The second optical patterns 372, 373, and 374 may be a set of identical or similar figures that are repeatedly arranged. Alternatively, the second optical patterns 372, 373, and 374 may be a single band that defines the entire area of the second optical patterns 372, 373, and 374. The color exhibited by the second optical patterns 372, 373, and 374 may be a complementary color to the color of light emitted by the light source 34' and incident on the light guide plate 38.

For example, the light source 34' may emit blue-based light. In addition, a yellow phosphor may be disposed around the light source 34'. In this case, the second optical patterns 372, 373, and 374 may include a yellow pigment. Alternatively, the second optical patterns 372, 373, and 374 may include a yellow phosphor. For example, the yellow phosphor in the second optical patterns 372, 373, and 374 may be Yttrium Aluminum Garnet (YAG), La3Si6N11, LuAG(Al5Lu3O12), or Silicate.

For example, the light source 34' may emit blue-based light, and the green phosphor GP (see FIGS. 22 and 23) may be disposed around the light source 34'. In this case, the second optical patterns 372, 373, and 374 may include a red pigment. Alternatively, the second optical patterns 372, 373, and 374 may include a red phosphor or a yellow phosphor. For example, the red phosphor in the second optical patterns 372, 373, and 374 may be (Sr,Ca)AlSiN3:Eu or (Sr, Ca, Ba)2SiN8:Eu, and the yellow phosphor in the second optical patterns 372, 373, and 374 may be Yttrium Aluminum Garnet (YAG), La3Si6N11, LuAG(Al5Lu3O12), or Silicate.

For example, the light source 34' may emit blue-based light, and the red phosphor RP (see the description of FIGS. 22 and 23) may be disposed around the light source 34'. In this case, the second optical patterns 372, 373, and 374 may include a green pigment. Alternatively, the second optical patterns 372, 373, and 374 may include a green phosphor. For example, the green phosphor in the second optical patterns 372, 373, and 374 may be SrGa2S4:Eu or β-SiAlon.

Accordingly, the second optical patterns 372, 373, and 374 may compensate for insufficient light conversion in the vicinity of the edge of the light guide plate 38, and as a result, light which is sufficiently converted into white light may also be provided to an outer part of the display panel 10.

In this case, a 2-1 optical pattern 372 may be adjacent to an upper side 37U of the reflective sheet 37 and may extend along the upper side 37U. A 2-2 optical pattern 373 may be adjacent to a left side 37L of the reflective sheet 37 and may extend along the left side 37L. A 2-3 optical pattern 374 may be adjacent to a right side 37R of the reflective sheet 37 and may extend along the right side 37R.

For example, a width D2 of the second optical patterns 372, 373, and 374 may be smaller than the width D1 of the first optical pattern 371. This is because the first optical pattern 371 is located on one side on which light from the light source 34' of the reflective sheet 37 or the light guide plate 38 is incident, but the second optical patterns 372, 373, and 374 are located on another side on which the light from the light source 34' of the reflective sheet 37 or the light guide plate 38 is not incident.

Accordingly, the first optical pattern 371 and the second optical patterns 372, 373, and 374 may efficiently compensate for insufficient light conversion in the vicinity of the edge of the light guide plate 38. Further, the optical patterns 371, 372, 373, and 374 may minimize a reduction in luminance.

Referring to FIG. 31, the optical patterns 371, 372, 373, and 374 may include dots. The dots may have the same size and may be spaced at regular intervals.

In this case, the width D2 of a region in which dots of the second optical patterns 372, 373, and 374 are located may be smaller than the width D1 of a region in which dots of the first optical pattern 371 are located.

Referring to FIG. 32, the optical patterns 371, 372, 373, and 374 may include dots. The dots may have the same size. A distance between the dots may increase away from the edge of the reflective sheet 37. In other words, a density of the dots may decrease away from the edge of the reflective sheet 37.

In this case, the width D2 of a region in which dots of the second optical patterns 372, 373, and 374 are located may be smaller than the width D1 of a region in which dots of the first optical pattern 371 are located.

Referring to FIG. 33, the optical patterns 371, 372, 373, and 374 may include dots. The size of dots may decrease away from the edge of the reflective sheet 37.

In this case, the width D2 of a region in which dots of the second optical patterns 372, 373, and 374 are located may be smaller than the width D1 of a region in which dots of the first optical pattern 371 are located.

Referring to FIG. 34, the optical patterns 371, 372, 373, and 374 may include lines. The length of lines may decrease away from the edge of the reflective sheet 37.

In this case, the width D2 of a region in which lines of the second optical patterns 372, 373, and 374 are located may be smaller than the width D1 of a region in which lines of the first optical pattern 371 are located.

Referring to FIGS. 35 and 36, the optical patterns 371, 372, 373, and 374 may be disposed between the light guide plate 38 and the reflective sheet 37. For example, the optical patterns 371, 372, 373, and 374 may be formed on the front surface of the reflective sheet 37. In another example, the optical patterns 371, 372, 373, and 374 may be formed on the rear surface of the light guide plate 38. In yet another example, the optical patterns 371, 372, 373, and 374 may be formed on the front surface of the reflective sheet 37 and the rear surface of the light guide plate 38.

The optical patterns 371, 372, 373, and 374 may be a set of identical or similar figures that are repeatedly arranged. Alternatively, the optical patterns 371, 372, 373, and 374 may be a single band that defines the entire area of the optical patterns 371, 372, 373, and 374. The color exhibited by the optical patterns 371, 372, 373, and 374 may be a complementary color to the color of light emitted by the light source 34' and incident on the light guide plate 38.

For example, the light source 34' may emit blue-based light. In addition, a yellow phosphor may be disposed around the light source 34'. In this case, the optical patterns 371, 372, 373, and 374 may include a yellow pigment. Alternatively, the optical patterns 371, 372, 373, and 374 may include a yellow phosphor. For example, the yellow phosphor in the optical patterns 371, 372, 373, and 374 may be Yttrium Aluminum Garnet (YAG), La3Si6N11, LuAG (Al5Lu3O12), or Silicate.

For example, the light source 34' may emit blue-based light, and the green phosphor GP (see FIGS. 22 and 23) may be disposed around the light source 34'. In this case, the optical patterns 371, 372, 373, and 374 may include a red pigment. Alternatively, the optical patterns 371, 372, 373, and 374 may include a red phosphor or a yellow phosphor. For example, the red phosphor in the optical patterns 371, 372, 373, and 374 may be (Sr, Ca)AlSiN3:Eu or (Sr, Ca, Ba)2SiN8:Eu, and the yellow phosphor in the optical patterns 371, 372, 373, and 374 may be Yttrium Aluminum Garnet (YAG), La3Si6N11, LuAG(Al5Lu3O12), or Silicate.

For example, the light source 34' may emit blue-based light, and the red phosphor RP (see the description of FIGS. 22 and 23) may be disposed around the light source 34'. In this case, the optical patterns 371, 372, 373, and 374 may include a green pigment. Alternatively, the optical patterns 371, 372, 373, and 374 may include a green phosphor. For example, the green phosphor in the optical patterns 371, 372, 373, and 374 may be SrGa2S4:Eu or β-SiAlon.

Accordingly, the optical patterns 371, 372, 373, and 374 may compensate for insufficient light conversion in the vicinity of the edge of the light guide plate 38, and as a result, light which is sufficiently converted into white light may also be provided to an outer part of the display panel 10.

A first optical pattern 371 may extend along the lower side 37D of the reflective sheet 37. The first optical pattern 371 may include dots. A distance between the dots may decrease toward the lower side 37D. For example, the dots may have the same size. A first region 371A of the first optical pattern 371 may be a region of the first optical pattern 371 that is adjacent to the lower side 37D, and a second region 371B of the first optical pattern 371 may be a region of the first optical pattern 371 that is spaced apart from the lower side 37D.

Dots in the first region 371A may be arranged in matrix form. For example, some of the dots in the first region 371A may be disposed on a first imaginary straight line that extends along the lower side 37D, and the others may be disposed on a second imaginary straight line that is parallel to the first straight line. A distance $g1a$ between the dots of the first region 371A in a first direction parallel to the lower side 37D may be equal or similar to a distance $g1b$ between the dots of the first region 371A in a second direction orthogonal to the first direction.

Dots in the second region 371B may be arranged in matrix form. For example, the dots in the second region 371B may be arranged in a zigzag manner in the second direction. In the first direction, a distance $g1e$ between the dots of the second region 371B may be greater than the distance $g1a$ between the dots of the first region 371A. In a direction in which the dots of the second region 371B are arranged in a zigzag manner, a distance $g1d$ between the dots of the second region 371B may be equal or similar to the distance $g1e$. In the second direction, a distance $g1c$ between the first region 371A and the second region 371B may be equal to or greater than the distance $g1b$. For example, in the first direction, a width of the second region 371B may be greater than a width of the first region 371a. Meanwhile, a third region 371C may include dots that are arranged along at least one row. In the first direction, a distance between the dots of the third region 371C may be greater than the distance $g1e$ between the dots of the second region 371B. In the second direction, a distance between the third region 371C and the second region 371B may be greater than a distance between the dots of the second region 371B.

A 2-1 optical pattern 372 may extend along the upper side 37U of the reflective sheet 37. The 2-1 optical pattern 372 may include dots. A distance between the dots may decrease toward the upper side 37U. For example, the dots may have the same size. A first region 372A of the 2-1 optical pattern 372 may be a region of the 2-1 optical pattern 372 that is adjacent to the upper side 37U, and a second region 372B of the 2-1 optical pattern 372 may be a region of the 2-1 optical pattern 372 that is spaced apart from the upper side 37U.

Dots in the first region 372A may be arranged in matrix form. For example, some of the dots in the first region 372A may be disposed on a first imaginary straight line that extends along the upper side 37U, and the others may be disposed on a second imaginary straight line that is parallel to the first straight line. A distance $g2a$ between the dots of the first region 371A in a first direction parallel to the upper side 37U may be equal or similar to a distance $g2b$ between the dots of the first region 372A in a second direction orthogonal to the first direction.

Dots in the second region 372B may be arranged in matrix form. For example, the dots in the second region 372B may be arranged in a zigzag manner in the second direction. In the first direction, a distance $g2e$ between the dots of the second region 372B may be greater than the distance $g2a$ between the dots of the first region 372A. In a direction in which the dots of the second region 372B are arranged in a zigzag manner, a distance $g2d$ between the dots of the second region 372B may be equal or similar to the distance $g2e$. In the second direction, a distance $g2c$ between the first region 372A and the second region 372B may be equal to or greater than the distance $g2b$. For example, in the second direction, a width of the second region 372B may be greater than a width of the first region 372A. Meanwhile, a third region 372C may include dots that are arranged along at least one row. In the first direction, a distance between the dots of the third region 372C may be greater than the distance $g2e$ between the dots of the second region 372B. In the second direction, a distance between the third region 372C and the second region 372B may be greater than a distance between the dots of the second region 372B.

A 2-2 optical pattern 373 may extend along the left side 37L of the reflective sheet 37. The 2-2 optical pattern 373 may include dots. A distance between the dots may decrease toward the left side 37L. For example, the dots may have the same size. A first region 373A of the 2-2 optical pattern 373 may be a region of the 2-2 optical pattern 373 that is adjacent to the left side 37L, and a second region 373B of the 2-2 optical pattern 373 may be a region of the 2-2 optical pattern 373 that is spaced apart from the left side 37L.

Dots in the first region 373A may be arranged in matrix form. For example, some of the dots in the first region 373A may be disposed on a first imaginary straight line that extends along the left side 37L, and the others may be disposed on a second imaginary straight line that is parallel to the first straight line. A distance $g3a$ between the dots of the first region 373A in a first direction parallel to the left side 37L may be equal or similar to a distance $g3b$ between the dots of the first region 373A in a second direction orthogonal to the first direction.

Dots in the second region 373B may be arranged in matrix form. For example, the dots in the second region 373B may be arranged in a zigzag manner in the second direction. In the first direction, a distance $g3e$ between the dots of the second region 373B may be greater than the distance $g3a$ between the dots of the first region 373A. In a direction in which the dots of the second region 373B are arranged in a zigzag manner, a distance $g3d$ between the dots of the second region 373B may be equal or similar to the distance $g3e$. In the second direction, a distance $g3c$ between the first region 373A and the second region 373B may be equal to or greater than the distance $g3b$. For example, in the second direction, a width of the second region 373B may be greater than a width of the first region 373A.

A 2-3 optical pattern 374 may extend along the right side 37R of the reflective sheet 37. The 2-3 optical pattern 374 may include dots. A distance between the dots may decrease toward the right side 37R. For example, the dots may have the same size. A first region 374A of the 2-3 optical pattern 374 may be a region of the 2-3 optical pattern 374 that is adjacent to the right side 37R, and a second region 374B of the 2-3 optical pattern 374 may be a region of the 2-3 optical pattern 374 that is spaced apart from the right side 37R.

Dots in the first region 374A may be arranged in matrix form. For example, some of the dots in the first region 374A may be disposed on a first imaginary straight line that extends along the right side 37R, and the others may be disposed on a second imaginary straight line that is parallel to the first straight line. A distance $g4a$ between the dots of the first region 374A in a first direction parallel to the right side 37R may be equal or similar to a distance g4b between the dots of the first region 374A in a second direction orthogonal to the first direction.

Dots in the second region 374B may be arranged in matrix form. For example, the dots in the second region 374B may be arranged in a zigzag manner in the second direction. In the first direction, a distance g4e between the dots of the second region 374B may be greater than the distance g4a between the dots of the first region 374A. In a direction in which the dots of the second region 374B are arranged in a zigzag manner, a distance g4d between the dots of the second region 374B may be equal or similar to the distance g4e. In the second direction, a distance g4c between the first region 374A and the second region 374B may be equal to or greater than the distance g4b. For example, in the second direction, a width of the second region 374B may be greater than a width of the first region 374A.

For example, the density of the second optical patterns 372, 373, and 374 may be smaller than the density of the first optical pattern 371. This is because the first optical pattern 371 is located on one side on which light from the light source 34' of the reflective sheet 37 or the light guide plate 38 is incident, but the second optical patterns 372, 373, and 374 are located on another side on which the light from the light source 34' of the reflective sheet 37 or the light guide plate 38 is not incident. For example, the density of the 2-1 optical pattern 372 may be greater than the density of the 2-2 optical pattern 373, and the density of the 2-3 optical pattern 374 may be equal to the density of the 2-2 optical pattern 373. Meanwhile, a width D12 of the 2-3 optical pattern 374 may be equal to a width D14 of the 2-2 optical pattern 373, a width D13 of the 2-1 optical pattern 372 may be smaller than the widths D12 and D14, and a width D11 of the first optical pattern 371 may be smaller than the width D13.

Accordingly, the first optical pattern 371 and the second optical patterns 372, 373, and 374 may efficiently compensate for insufficient light conversion in the vicinity of the edge of the light guide plate 38. Further, the optical patterns 371, 372, 373, and 374 may minimize a reduction in luminance.

Referring to FIGS. 37 and 38, a first side reflector 382 may be bonded or adhered to an upper side 38U of the light guide plate 38. Here, the upper side 38U may be an example of a second side that is opposite to a first side (e.g., see the lower side 38D) of the light guide plate 38 on which light from the light source is incident. The first side reflector 382 may include a first adhesion part 382a and a first reflection part 382b.

The first adhesion part 382a may extend along the upper side 38U and may be adhered to the upper side 38U. The first adhesion part 382a may include a colorant such as dye or pigment. The color emitted or exhibited by the first adhesion part 382a may be a complementary color to the color of light emitted by the light source 34' and incident on the light guide plate 38. The first adhesion part 382a may be provided separately from the first reflection part 382b or may be formed as one body with the first reflection part 382b. The first adhesion part 382a may be referred to as double-sided tape 382a.

For example, the light source that provides light to the light guide plate 38 may emit blue-based light. In addition, a yellow phosphor may be disposed around the light source. In this case, the colorant of the first adhesion part 382a may be a yellow dye or a yellow pigment. Alternatively, the first adhesion part 382a may include a yellow phosphor. For example, the yellow phosphor in the first adhesion part 382a may Yttrium Aluminum Garnet (YAG), La3Si6N11, LuAG (Al5Lu3O12), or Silicate.

For example, the light source that provides light to the light guide plate 38 may emit blue-based light, and the green phosphor GP (see FIGS. 22 and 23) may be disposed around the light source. In this case, the colorant of the first adhesion part 382a may be a red dye or a red pigment. Alternatively, the first adhesion part 382a may include a red phosphor or a yellow phosphor. For example, the red phosphor in the first adhesion part 382a may be (Sr,Ca)AlSiN3:Eu or (Sr, Ca, Ba)2SiN8:Eu, and the yellow phosphor in the first adhesion part 382a may be Yttrium Aluminum Garnet (YAG), La3Si6N11, LuAG(Al5Lu3O12), or Silicate.

For example, the light source that provides light to the light guide plate 38 may emit blue-based light, and the red phosphor RP (see the description of FIGS. 22 and 23) may be disposed around the light source. In this case, the colorant of the first adhesion part 382a may be a green dye or a green pigment. Alternatively, the first adhesion part 382a may include a green phosphor. For example, the green phosphor in the first adhesion part 382a may be SrGa2S4:Eu or β-SiAlon.

The first reflection part 382b may extend along the first adhesion part 382a and may be opposite to the upper side 38U with respect to the first adhesion part 382a. The first reflection part 382b may be adhered to the first adhesion part 382a. The first reflection part 382b may include a reflecting material. A portion of the light incident on the light guide plate 38 may be transmitted through the first adhesion part 382a and reflected from the first reflection part 382b.

Accordingly, the first reflection part 382b of the first side reflector 382 may minimize light leakage through the upper side 38U of the light guide plate 38 and may increase luminance efficiency. In addition, light leaking through the upper side 38U of the light guide plate 38 may be sufficiently converted into white light by the first adhesion part 382a of the first side reflector 382.

For example, referring to FIG. 37, the first optical pattern 371 may be adjacent to the lower side 38D of the light guide plate 38 and may be formed between the light guide plate 38 and the reflective sheet 37. As described above, the first optical pattern 371 may be a set of identical or similar figures that are repeatedly arranged, or may be a single band that defines the entire area of the first optical pattern 371. Alternatively, the first optical pattern 371 may be a set of dimples formed on a bottom surface of the light guide plate 38 that faces the reflective sheet 37. Meanwhile, the first optical pattern 371 may be omitted.

In another example, referring to FIG. 38, the 2-2 optical pattern 373 may be adjacent to the left side 38L of the light guide plate 38, and the 2-3 optical pattern 374 may be adjacent to the right side 38R of the light guide plate 38, and the 2-2 optical pattern 373 and the 2-3 optical pattern 374 may be disposed between the light guide plate 38 and the reflective sheet 37. As described above, the 2-2 optical pattern 373 and the 2-3 optical pattern 374 may be a set of identical or similar figures that are repeatedly arranged, or may be a single band that defines the area of each of the patterns. Alternatively, the 2-2 optical pattern 373 and the 2-3 optical pattern 374 may be a set of dimples formed on a bottom surface of the light guide plate 38 that faces the reflective sheet 37. Meanwhile, the first optical pattern 371 may be omitted.

In yet another example, the 2-1 optical pattern 372 (see FIG. 36) may be adjacent to the upper side 38U of the light guide plate 38, and may be disposed between the light guide plate 38 and the reflective sheet 37. As described above, the 2-1 optical pattern 372 may be a set of identical or similar figures that are repeatedly arranged, or may be a single band that defines the entire area of the 2-1 optical pattern 372. Alternatively, the 2-1 optical pattern 372 may be a set of dimples formed on a bottom surface of the light guide plate 38 that faces the reflective sheet 37. Meanwhile, at least one of the first optical pattern 371, the 2-2 optical pattern 373, or the 2-3 optical pattern 374 may be omitted.

Accordingly, light leaking through at least a portion of the edge of the light guide plate 38 may be sufficiently converted into white light by the optical patterns 371, 372, 373, and 374.

Referring to FIGS. 39 and 40, a second side reflector 383 may be bonded or adhered to a left side 38L of the light guide plate 38. The second side reflector 383 may include a second adhesion part 383a and a second reflection part 383b.

The second adhesion part 383a may extend along the left side 38L and may be adhered to the left side 38L. The second adhesion part 383a may include a colorant such as dye or pigment. The color emitted or exhibited by the second adhesion part 383a may be a complementary color to the color of light emitted by the light source 34' and incident on the light guide plate 38. The second adhesion part 383a may be provided separately from the second reflection part 383b or may be formed as one body with the second reflection part 383b. The second adhesion part 383a may be referred to as double-sided tape 383a.

For example, the light source that provides light to the light guide plate 38 may emit blue-based light. In addition, a yellow phosphor may be disposed around the light source. In this case, the colorant of the second adhesion part 383a may be a yellow dye or a yellow pigment. Alternatively, the second adhesion part 383a may include a yellow phosphor. For example, the yellow phosphor in the second adhesion part 383a may be Yttrium Aluminum Garnet (YAG), La3Si6N11, LuAG(Al5Lu3O12), or Silicate.

For example, the light source that provides light to the light guide plate 38 may emit blue-based light, and the green phosphor GP (see FIGS. 22 and 23) may be disposed around the light source. In this case, the colorant of the second adhesion part 383a may be a red dye or a red pigment. Alternatively, the second adhesion part 383a may include a red phosphor or a yellow phosphor. For example, the red phosphor in the second adhesion part 383a may be (Sr,Ca)AlSiN3:Eu or (Sr, Ca, Ba)2SiN8:Eu, and the yellow phosphor in the second adhesion part 383a may be Yttrium Aluminum Garnet (YAG), La3Si6N11, LuAG(Al5Lu3O12), or Silicate.

For example, the light source that provides light to the light guide plate 38 may emit blue-based light, and the red phosphor RP (see the description of FIGS. 22 and 23) may be disposed around the light source. In this case, the colorant of the second adhesion part 383a may be a green dye or a green pigment. Alternatively, the second adhesion part 383a may include a green phosphor. For example, the green phosphor in the second adhesion part 383a may be SrGa2S4:Eu or β-SiAlon.

The second reflection part 383b may extend along the second adhesion part 383a and may be opposite to the left side 38L with respect to the second adhesion part 383a. The second reflection part 383b may be adhered to the second adhesion part 383a. The second reflection part 383b may include a reflecting material. A portion of the light incident on the light guide plate 38 may be transmitted through the second adhesion part 383a and reflected from the second reflection part 383b.

Accordingly, the second reflection part 383b of the second side reflector 383 may minimize light leakage through the left side 38L of the light guide plate 38 and may increase luminance efficiency. In addition, light leaking through the left side 38L of the light guide plate 38 may be sufficiently converted into white light by the second adhesion part 383a of the second side reflector 383.

A third side reflector 384 may be bonded or adhered to a right side 38R of the light guide plate 38. The third side reflector 384 may include a third adhesion part 384a and a third reflection part 384b.

The third adhesion part 384a may extend along the right side 38R and may be adhered to the right side 38R. The third adhesion part 384a may include a colorant such as dye or pigment. The color emitted or exhibited by the third adhesion part 384a may be a complementary color to the color of light emitted by the light source 34' and incident on the light guide plate 38. The third adhesion part 384a may be provided separately from the third reflection part 384b or may be formed as one body with the third reflection part 384b. The third adhesion part 384a may be referred to as double-sided tape 384a.

For example, the light source that provides light to the light guide plate 38 may emit blue-based light. In addition, a yellow phosphor may be disposed around the light source. In this case, the colorant of the third adhesion part 384a may be a yellow dye or a yellow pigment. Alternatively, the third adhesion part 384a may include a yellow phosphor. For example, the yellow phosphor in the third adhesion part 384a may be Yttrium Aluminum Garnet (YAG), La3Si6N11, LuAG(Al5Lu3O12), or Silicate.

For example, the light source that provides light to the light guide plate 38 may emit blue-based light, and the green phosphor GP (see FIGS. 22 and 23) may be disposed around the light source. In this case, the colorant of the third adhesion part 384a may be a red dye or a red pigment. Alternatively, the third adhesion part 384a may include a red phosphor or a yellow phosphor. For example, the red phosphor in the third adhesion part 384a may be (Sr,Ca)AlSiN3:Eu or (Sr, Ca, Ba)2SiN8:Eu, and the yellow phosphor in the third adhesion part 384a may be Yttrium Aluminum Garnet (YAG), La3Si6N11, LuAG(Al5Lu3O12), or Silicate.

For example, the light source that provides light to the light guide plate 38 may emit blue-based light, and the red phosphor RP (see the description of FIGS. 22 and 23) may be disposed around the light source. In this case, the colorant of the third adhesion part 384a may be a green dye or a green pigment. Alternatively, the third adhesion part 384a may include a green phosphor. For example, the green phosphor in the third adhesion part 384a may be SrGa2S4:Eu or β-SiAlon.

The third reflection part 384b may extend along the third adhesion part 384a and may be opposite to the right side 38R with respect to the third adhesion part 384a. The third reflection part 384b may be adhered to the third adhesion part 384a. The third reflection part 384b may include a reflecting material. A portion of the light incident on the light guide plate 38 may be transmitted through the third adhesion part 384a and reflected from the third reflection part 384b.

Accordingly, the third reflection part 383b of the second side reflector 383 may minimize light leakage through the right side 38R of the light guide plate 38 and may increase luminance efficiency. In addition, light leaking through the right side 38R of the light guide plate 38 may be sufficiently converted into white light by the third adhesion part 384a of the third side reflector 384.

For example, referring to FIG. 39, the first optical pattern 371 may be adjacent to the lower side 38D of the light guide plate 38 and may be disposed between the light guide plate 38 and the reflective sheet 37. As described above, the first optical pattern 371 may be a set of identical or similar figures that are repeatedly arranged, or may be a single band that defines the entire area of the first optical pattern 371. Alternatively, the first optical pattern 371 may be a set of dimples formed on a bottom surface of the light guide plate 38 that faces the reflective sheet 37. Meanwhile, the first optical pattern 371 may be omitted.

In another example, referring to FIG. 40, the 2-1 optical pattern 372 may be adjacent to the upper side 38U of the light guide plate 38 and may be disposed between the light guide plate 38 and the reflective sheet 37. As described above, the 2-1 optical pattern 372 may be a set of identical or similar figures that are repeatedly arranged, or may be a single band that defines the entire area of the 2-1 optical pattern 372. Alternatively, the 2-1 optical pattern 372 may be a set of dimples formed on a bottom surface of the light guide plate 38 that faces the reflective sheet 37. Meanwhile, the first optical pattern 371 may be omitted.

In yet another example, the 2-2 optical pattern 373 (see FIG. 36) may be adjacent to the left side 38L of the light guide plate 38, and the 2-3 optical pattern 374 (see FIG. 37) may be adjacent to the right side 38R of the light guide plate 38, and the 2-2 optical pattern 373 and the 2-3 optical pattern 374 may be disposed between the light guide plate 38 and the reflective sheet 37. As described above, the 2-2 optical pattern 373 and the 2-3 optical pattern 374 may be a set of identical or similar figures that are repeatedly arranged, or may be a single band that defines the area of each of the patterns. Alternatively, the 2-2 optical pattern 373 and the 2-3 optical pattern 374 may be a set of dimples formed on a bottom surface of the light guide plate 38 that faces the reflective sheet 37. Meanwhile, at least one of the first optical pattern 371 or the 2-1 optical pattern 372 may be omitted.

Accordingly, light leaking through at least a portion of the edge of the light guide plate 38 may be sufficiently converted into white light by the optical patterns 371, 372, 373, and 374.

Referring to FIG. 41, the first side reflector 382 may be adhered to the upper side 38U of the light guide plate 38, the second side reflector 383 may be adhered to the left side 38L of the light guide plate 38, and the third side reflector 384 may be adhered to the right side 38R of the light guide plate 38.

For example, the optical patterns 371, 372, 373, and 374 may be disposed between the light guide plate 38 and the reflective sheet 37, and may extend along the edge of the light guide plate 38.

Accordingly, the side reflectors 382, 383, and 384 may minimize light leakage through the edge of the light guide plate 38. In addition, even when the light leaks through the edge of the light guide plate 38, the light may be sufficiently converted into white light by the side reflectors 382, 383, and 384 and the optical patterns 371, 372, 373, and 374. As a result, a color difference in the vicinity of the edge of the display panel may be improved.

A concentration of the colorant in the first side reflector 382 with respect to the first side reflector 382 may be a first concentration. A concentration of the colorant in the second side reflector 383 with respect to the second side reflector 383 may be a second concentration. A concentration of the colorant in the third side reflector 384 with respect to the third side reflector 384 may be a third concentration. For example, the first concentration may be higher than the second concentration and the third concentration. For example, the second concentration may be equal to the third concentration. This is because the first side reflector 382 is located on the upper side 38U opposite to the lower side 38D of the light guide plate 38 on which light from the light source is incident, but the second and third side reflectors 383 and 384 are located on the left and right sides 38L and 38R. In other words, the first side reflector 382 with a relatively high concentration is disposed on the upper side 38U of the light guide plate 38 where a relatively large amount of light is expected to leak, such that light leaking through the edge of the light guide plate 38 may be efficiently converted into white light. Alternatively, the first concentration may be equal to the second and third concentrations.

Referring to FIGS. 1 to 41, a display device according to an embodiment of the present disclosure may include: a display panel; a light guide plate positioned behind the display panel; a reflective sheet positioned behind the light guide plate; a light-absorbing layer positioned between the light guide plate and the display panel and absorbing light within a certain wavelength range; an optical assembly providing light to one side of the light guide plate; and a side reflector positioned at the other side of the light guide plate, including a reflecting material, and having a specific color.

The optical assembly may include a light source emitting blue-based light, and the side reflector may have a yellow color.

The light-absorbing layer may include a green phosphor and a red phosphor.

The light-absorbing layer may include: a first light-absorbing layer including the green phosphor; and a second light-absorbing layer including the red phosphor.

The optical assembly may include: a light source emitting blue-based light; and a green phosphor disposed around the light source, wherein the side reflector may have a red color.

The light-absorbing layer may include a red phosphor.

The optical assembly may include: a light source emitting blue-based light; and a red phosphor disposed around the light source, wherein the side reflector may have a green color.

The light-absorbing layer may include a green phosphor.

The side reflector may include: an adhesion part adhered to the other side of the light guide plate; and a reflection part opposite to the other side of the light guide plate with respect to the adhesion part and adhered to the adhesion part, wherein the adhesion part may have the specific color, and the reflection part may include the reflecting material.

A side surface of the light guide plate may include: a first side on which light from the optical assembly is incident; a second side opposite to the first side; a third side connecting one end of the first side and one end of the second side; and a fourth side opposite to the third side, wherein the side reflector may be positioned on at least one of the second side, the third side, or the fourth side.

The side reflector may include: a first side reflector positioned on the second side and extending along the second side; a second side reflector positioned on the third side and extending along the third side; and a third side reflector positioned on the fourth side and extending along the fourth side, wherein a concentration of a colorant in the first side reflector may be higher than a concentration of a colorant in the second side reflector and a concentration of a colorant in the third side reflector.

The display device may further include an optical pattern disposed between the light guide plate and the reflective sheet, wherein the optical pattern may be adjacent to at least one of the first side, the second side, the third side, or the fourth side.

The optical pattern may have a same color as the side reflector or may include a phosphor.

A density of the optical pattern may increase toward an edge of the light guide plate.

The optical pattern may include: a first optical pattern adjacent to the first side and extending along the first side; a 2-1 optical pattern adjacent to the second side and extending along the second side; a 2-2 optical pattern adjacent to the third side and extending along the third side; and a 2-3 optical pattern adjacent to the fourth side and extending along the fourth side, wherein a density of the first optical pattern may be greater than a density of the 2-1 optical pattern, and the density of the 2-1 optical pattern may be greater than a density of the 2-2 optical pattern and a density of the 2-3 optical pattern.

A display device according to another embodiment of the present disclosure may include: a display panel; an optical assembly providing light to the display panel; and a light-absorbing layer positioned in a path of light provided from the optical assembly to the display panel, and including a phosphor, wherein the optical assembly may includes: a light source providing blue-based light; an encapsulant covering a perimeter of the light source; and a phosphor disposed in the encapsulant, wherein any one of the phosphor of the light-absorbing layer and the phosphor of the optical assembly may be a red phosphor, and a remaining one may be a green phosphor.

The color exhibited by the side reflector may be a complementary color to a color of the light emitted by the optical assembly.

The light-absorbing layer may include a red phosphor or a green phosphor.

The light-absorbing layer may include: a first light-absorbing layer including the red phosphor or the green phosphor; and a second light-absorbing layer including a same phosphor as that of the first light-absorbing layer.

The first light-absorbing layer may be positioned between the optical assembly and the display panel, and the second light-absorbing layer may be positioned between the first light-absorbing layer and the display panel.

The first light-absorbing layer may be thicker than the second light-absorbing layer, and the second light-absorbing layer may be adhered to the first light-absorbing layer.

The display device may further include: a light guide plate disposed opposite to the display panel with respect to the light-absorbing layer; and a guide panel extending along a periphery of the light guide plate, the guide panel including a vertical part covering the periphery of the light guide plate, and a horizontal part extending from the vertical part towards between the display panel and the light-absorbing layer; and a first pad disposed between the horizontal part and the light-absorbing layer, coupled to the horizontal part, and adjacent to or in contact with a front surface of the light-absorbing layer, wherein the light source may provide light to one side of the light guide plate, and the first pad may include a phosphor layer containing a phosphor.

The phosphor of the optical assembly may be a green phosphor, and the phosphor of the phosphor layer may be a red phosphor.

The phosphor of the optical assembly may be a red phosphor, and the phosphor of the phosphor layer may be a green phosphor.

The light-absorbing layer may be offset from the light guide plate in a direction from the one side of the light guide plate toward the other side opposite to the one side, wherein the display device may further include a second pad adjacent to the one side of the light guide plate and disposed between the horizontal pat and the light guide plate, coupled to the horizontal part, and adjacent to or in contact with a front surface of the light guide plate, wherein the second pad may include a phosphor layer containing a phosphor, and the phosphor of the phosphor layer of the second pad may be the same as the phosphor of the phosphor layer of the first pad.

The display device may further include: a light guide plate having a front surface to which the light-absorbing layer is coupled, and one side facing the light source; an optical sheet coupled to a front surface of the light-absorbing layer; a reflective sheet coupled to a rear surface of the light guide plate; and a first optical pattern adjacent to the one side of the light guide plate and disposed between the light guide plate and the reflective sheet, wherein the first optical pattern may include a phosphor.

The first optical pattern may be formed at least one of the light guide plate or the reflective sheet.

The phosphor of the optical assembly may be a green phosphor, and the phosphor of the first optical pattern may be a red phosphor.

The phosphor of the optical assembly may be a red phosphor, and the phosphor of the first optical pattern may be a green phosphor.

The display device may further include a second optical pattern adjacent to the other side of the light guide plate and disposed between the light guide plate and the reflective sheet, wherein the second optical pattern may include a phosphor, wherein the phosphor of the second optical pattern may be the same as the phosphor of the first optical pattern.

A width of the second optical pattern may be smaller than a width of the first optical pattern.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

What is claimed is:
1. A display device comprising:
a display panel;
a light guide plate positioned behind the display panel;
a reflective sheet positioned behind the light guide plate;
a light-absorbing layer positioned between the light guide plate and the display panel, the light-absorbing layer configured to absorb light within a certain wavelength range;
an optical assembly providing light to one side of the light guide plate; and a side reflector positioned at another side of the light guide plate, including a reflecting material, and having a specific color, wherein the side reflector comprises:
an adhesion part adhered to the other side of the light guide plate; and
a reflection part opposite to the other side of the light guide plate with respect to the adhesion part and adhered to the adhesion part, and wherein the adhesion part has the specific color, and the reflection part includes the reflecting material.

2. The display device of claim 1, wherein the specific color of the side reflector is a complementary color to a color of the light provided by the optical assembly.

3. The display device of claim 1, wherein the optical assembly comprises a light source emitting blue-based light, and the side reflector has a yellow color.

4. The display device of claim 3, wherein the light-absorbing layer comprises a green phosphor and a red phosphor.

5. The display device of claim 1, wherein the optical assembly comprises:
a light source emitting blue-based light; and
a green phosphor disposed around the light source,
wherein the side reflector has a red color.

6. The display device of claim 5, wherein the light-absorbing layer comprises a red phosphor.

7. The display device of claim 1, wherein the optical assembly comprises:
a light source emitting blue-based light; and
a red phosphor disposed around the light source,
wherein the side reflector has a green color.

8. The display device of claim 7, wherein the light-absorbing layer comprises a green phosphor.

9. The display device of claim 1, wherein a side surface of the light guide plate comprises:
a first side on which light from the optical assembly is incident;
a second side opposite to the first side;
a third side connecting one end of the first side and one end of the second side; and
a fourth side opposite to the third side, wherein the side reflector is positioned on at least one of the second side, the third side, or the fourth side.

10. The display device of claim 9, wherein the side reflector comprises:
a first side reflector positioned on the second side and extending along the second side;
a second side reflector positioned on the third side and extending along the third side; and
a third side reflector positioned on the fourth side and extending along the fourth side, wherein a concentration of a colorant in the first side reflector is higher than a concentration of a colorant in the second side reflector and a concentration of a colorant in the third side reflector.

11. The display device of claim 9, further comprising an optical pattern disposed between the light guide plate and the reflective sheet, wherein the optical pattern is adjacent to at least one of the first side, the second side, the third side, or the fourth side.

12. The display device of claim 11, wherein the optical pattern has a same color as the side reflector or includes a phosphor.

13. The display device of claim 11, wherein a density of the optical pattern increases toward an edge of the light guide plate.

14. The display device of claim 13, wherein the optical pattern comprises:
a first optical pattern adjacent to the first side and extending along the first side;
a 2-1 optical pattern adjacent to the second side and extending along the second side;
a 2-2 optical pattern adjacent to the third side and extending along the third side; and
a 2-3 optical pattern adjacent to the fourth side and extending along the fourth side, wherein a density of the first optical pattern is greater than a density of the 2-1 optical pattern, and the density of the 2-1 optical pattern is greater than a density of the 2-2 optical pattern and a density of the 2-3 optical pattern.

* * * * *